(12) United States Patent
Baker

(10) Patent No.: US 7,036,734 B2
(45) Date of Patent: May 2, 2006

(54) FREE STANDING COLUMN-SHAPED STRUCTURE FOR HOUSING RFID ANTENNAS AND READERS

(75) Inventor: John E. Baker, Plano, TX (US)

(73) Assignee: Venture Research Inc., Plano, TX (US)

( * ) Notice: Subject to any disclaimer, the term of this patent is extended or adjusted under 35 U.S.C. 154(b) by 0 days.

(21) Appl. No.: 11/051,120

(22) Filed: Feb. 4, 2005

(65) Prior Publication Data

US 2005/0168385 A1    Aug. 4, 2005

Related U.S. Application Data

(60) Provisional application No. 60/541,710, filed on Feb. 4, 2004.

(51) Int. Cl.
*H01Q 9/34* (2006.01)
*G06K 7/08* (2006.01)

(52) U.S. Cl. .................................. 235/451; 343/874
(58) Field of Classification Search ............... 235/487, 235/492, 451; 340/572.1–572.9; 343/874–900
See application file for complete search history.

(56) References Cited

U.S. PATENT DOCUMENTS

| | | | |
|---|---|---|---|
| 4,373,163 A * | 2/1983 | Vandebult | 343/842 |
| 5,604,485 A * | 2/1997 | Lauro et al. | 340/572.5 |
| 6,278,413 B1 | 8/2001 | Hugh et al. | |
| 6,609,656 B1 | 8/2003 | Elledge | |
| 6,614,351 B1 | 9/2003 | Mann et al. | |
| 6,621,416 B1 * | 9/2003 | Okamura | 340/571 |
| 6,667,092 B1 | 12/2003 | Brollier et al. | |
| 6,669,089 B1 | 12/2003 | Cybulski et al. | |
| 2001/0000019 A1 | 3/2001 | Bowers et al. | |
| 2002/0044057 A1 | 4/2002 | Zirbes | |
| 2002/0044096 A1 | 4/2002 | Chung | |
| 2002/0089434 A1 | 7/2002 | Ghazarian | |
| 2003/0080192 A1 | 5/2003 | Tsikos et al. | |
| 2003/0085281 A1 | 5/2003 | Knowles et al. | |
| 2003/0117268 A1 | 6/2003 | Hewitt et al. | |
| 2003/0141366 A1 | 7/2003 | Hartmann | |

FOREIGN PATENT DOCUMENTS

| | | |
|---|---|---|
| JP | 2003-249880 | 9/2003 |
| WO | WO 99/56260 | 11/1999 |
| WO | WO 00/14694 | 3/2000 |
| WO | WO 03/061060 A1 | 7/2003 |
| WO | WO 03/096291 A2 | 11/2003 |
| WO | WO 03/100740 A1 | 12/2003 |
| WO | WO 2004/010096 A1 | 1/2004 |

* cited by examiner

*Primary Examiner*—Michael G. Lee
*Assistant Examiner*—Jamara A. Franklin
(74) *Attorney, Agent, or Firm*—Barry W. Dove; Barry Dove Patent Services, Inc.

(57) ABSTRACT

An RFID system is provided, which includes one or more radio frequency antennas and a generally column-shaped structure. The generally column-shaped structure supports the antenna(s) therein. The structure may include a base portion, a frame portion, one ore more paddle portions, and an external body portion. In such case, the frame portion is attached to and supported by the base portion. The frame portion extends along a vertical axis of the structure. Each paddle portion is pivotably coupled to the frame portion. Each paddle portion supports one or more antennas attached thereto. The hollow and elongated external body portion is attached to and supported by the base portion. The external body portion extends along the vertical axis. The frame portion, the paddle portion(s), and the antenna(s) are located within the external body portion.

36 Claims, 21 Drawing Sheets

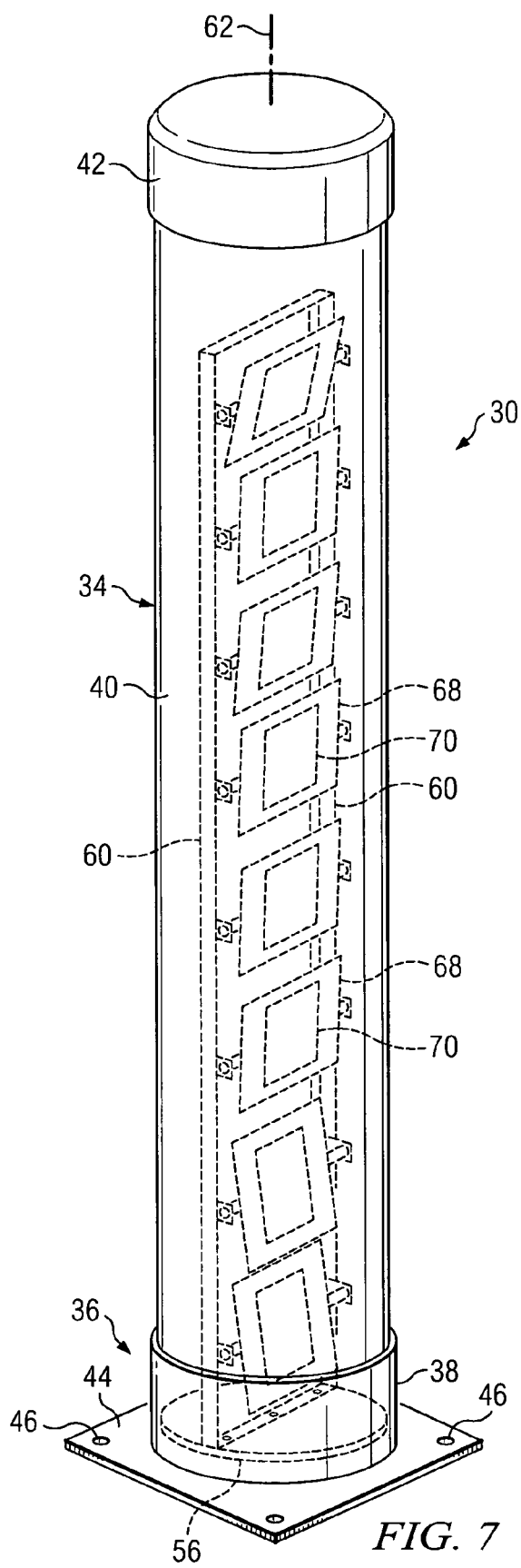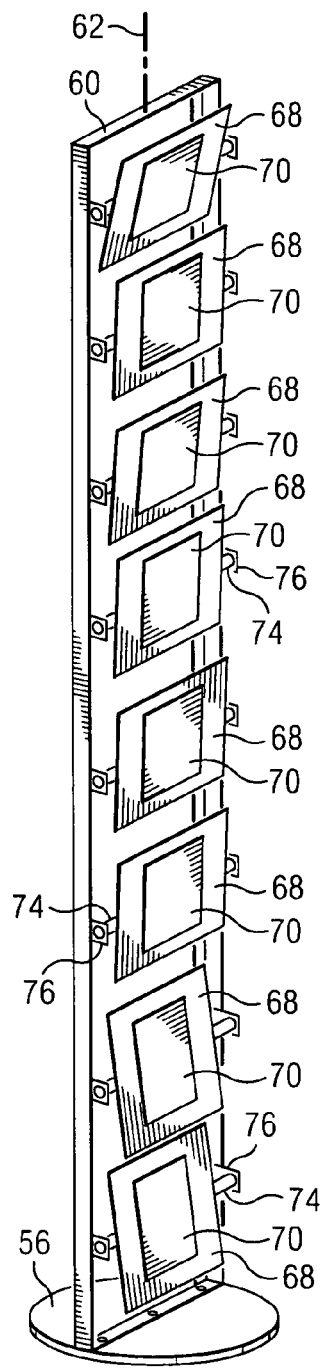
FIG. 7
FIG. 8

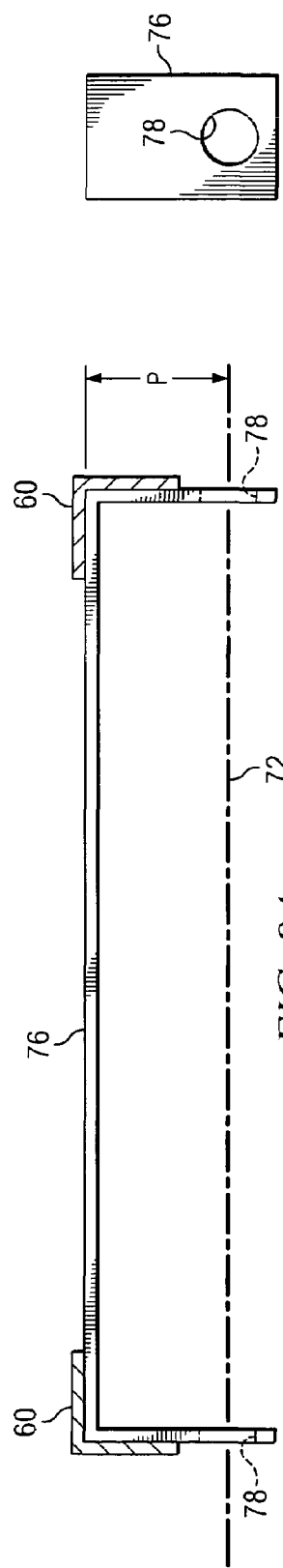
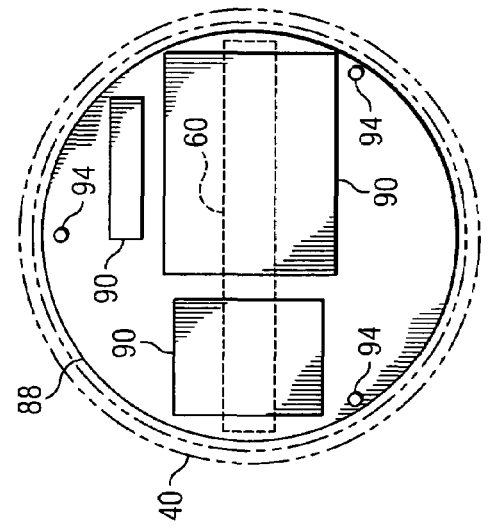
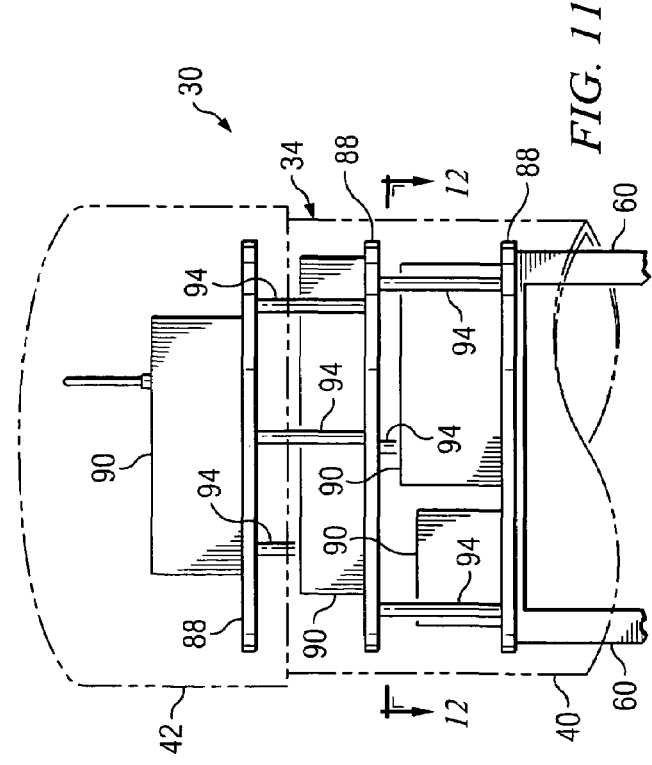
FIG. 9B
FIG. 12
FIG. 9A
FIG. 11

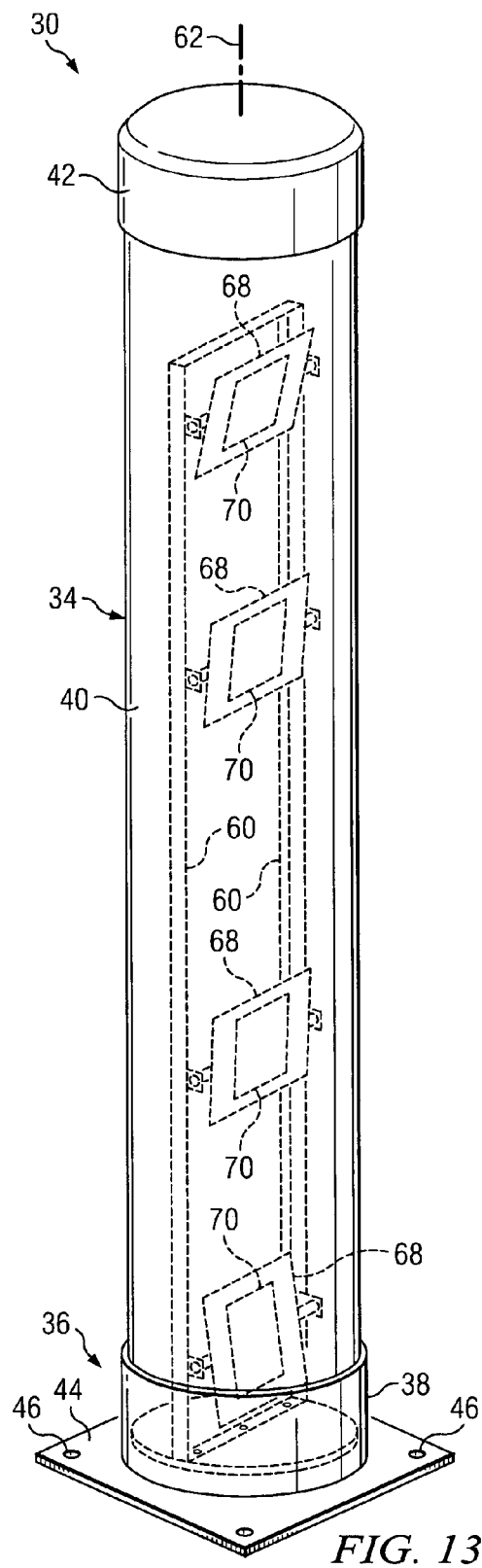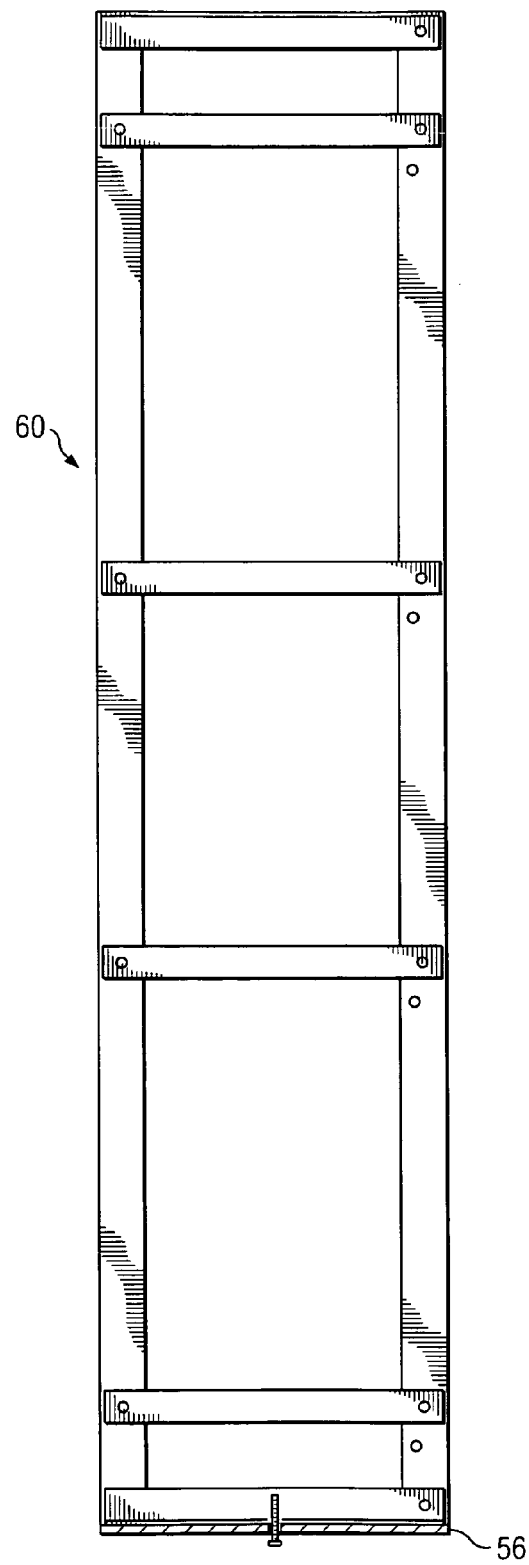
*FIG. 13*     *FIG. 14*

FREE STANDING COLUMN-SHAPED STRUCTURE FOR HOUSING RFID ANTENNAS AND READERS

This application claims the priority benefit of commonly owned U.S. Provisional Patent Application having Ser. No. 60/541,710 entitled COLUMN-SHAPED FREE-STANDING RFID ANTENNA SUPPORT STRUCTURE filed on Feb. 4, 2004, which is hereby incorporated by reference.

TECHNICAL FIELD

The present invention generally relates to radio frequency identification (RFID) systems. More specifically, it relates to structures for use in supporting RFID antennas and/or RFID readers.

BACKGROUND

Radio frequency identification (RFID) systems usually include at least one radio frequency antenna and a reader. During a typical usage, the RFID system transmits a radio frequency at a certain frequency or within a certain frequency range towards an RFID tag. An RFID tag typically includes a chip (often smaller than a pin head) and an antenna portion. The energy in the radio waves transmitted onto the tag may be used to "excite" or energize the tag. The chip is often programmed with a globally unique identification (GUID) number, and upon exciting the tag, the GUID number is emitted from the tag in the form of radio waves. A receiving antenna of the RFID system receives the radio waves emitted from the tag, and a reader device extracts the GUID number from the signal in the tag's emitted radio waves. This GUID number may then be correlated to a product or item in a database. The transmitting antenna may be separate from the receiving antenna (e.g., pitch-catch configuration), or they may be one and the same (i.e., transmit and receive with same antenna).

RFID systems may have a variety of forms and configurations for different applications, such as: a hand held device (e.g., wand), a free standing structure (e.g., theft detection devices in retail stores), a fixed structure attached to or extending from a building (e.g., warehouse inventory tracking), or a toll tag reader structure above a toll road, for example. In most existing warehouse usages of RFID systems, some or all of the RFID components (e.g., antenna, reader) of the system are exposed. In a warehouse, there are typically forklifts and carts regularly moving boxes and crates of products past and near the RFID system. Hence, there is a likelihood that the exposed RFID components may be bumped, hit, or damaged during regular operation of the warehouse. Many times, an RFID system is tuned and an RFID antenna is set at a particular position and angle for optimum ability to read tags passing thereby. A movement or repositioning of such an antenna in a tuned system may reduce the performance of the system or even render the system inoperable. As the reliance on and usage of RFID tags and systems increases, the demand for rugged and reliable RFID systems is likely to increase. Hence, a need exists for an RFID system that provides increased protection of the RFID components in the system, but without significantly compromising the ability to tune the system, without significantly hindering the performance of the system, and without consuming a significant amount of warehouse space. Furthermore, it would be preferable to provide such a system without it being overly complex and expensive.

SUMMARY OF THE INVENTION

The problems and needs outlined above may be addressed by embodiments of the present invention. In accordance with one aspect of the present invention, a radio frequency identification (RFID) system is provided, which includes one or more radio frequency antennas and a generally column-shaped structure. The generally column-shaped structure supports the antenna(s) therein. The structure includes a base portion, a frame portion, one ore more paddle portions, and an external body portion. The frame portion is attached to and supported by the base portion. The frame portion extends along a vertical axis of the structure. Each paddle portion is pivotably coupled to the frame portion. Each paddle portion supports one or more antennas attached thereto. The hollow and elongated external body portion is attached to and supported by the base portion. The external body portion extends along the vertical axis. The frame portion, the paddle portion(s), and the antenna(s) are located within the external body portion.

In accordance with another aspect of the present invention, an RFID system is provided, which includes one or more radio frequency antennas and a generally column-shaped structure. The generally column-shaped structure supports the antenna(s) therein. The structure includes a base portion, a coupler member, a frame portion, one ore more paddle portions, and an external body portion. The frame portion is attached to and supported by the base portion. The frame portion extends along a vertical axis of the structure. The frame portion is adapted to pivot about the vertical axis with respect to the base portion. Each paddle portion is pivotably coupled to the frame portion. Each paddle portion is adapted to pivot about a horizontal axis. Each paddle portion supports one or more antennas attached thereto. The hollow coupler member is attached to the base portion. The hollow and elongated external body portion is attached to the base portion by the coupler member and extends along the vertical axis. The external body portion is supported by the base portion. The frame portion, the paddle portion(s), and the antenna(s) are located within the external body portion.

In accordance with still another aspect of the present invention, an RFID system is provided, which includes one or more radio frequency antennas and a generally column-shaped structure. The generally column-shaped structure supports the antenna(s) therein. The structure includes a base portion and a cylindrical-shaped hollow external body portion. The external body portion extends along a vertical axis. The external body portion is supported by the base portion. The antenna is located within the external body portion.

In accordance with yet another aspect of the present invention, a radio frequency identification (RFID) system is provided, which includes a radio frequency antenna and a generally column-shaped structure. The structure supports the antenna therein. The structure includes a base portion, a hollow external body portion, and a switch. The hollow external body portion is adapted to extend along a vertical axis and to be supported by the base portion when the structure is in a first configuration such that the antenna is located within the external body portion. The switch is located between the base portion and the external body portion when the structure is in the first configuration. In the first configuration of the structure, the external body portion is operably installed relative to the base portion, the antenna is located within the external body portion, the switch is in a first switch position, and based upon the switch being in the first switch position, the power supplied to the antenna during use is above a first predetermined level and below a second predetermined level. The second predetermined level is greater than the first predetermined level. The structure also has a second configuration in which at least part of the external body portion is farther from the base portion along the vertical axis than when the structure is in the first configuration, the switch is in a second switch position, and based upon the switch being in the second switch position, the power supplied to the antenna during use is at or below the first predetermined level.

In accordance with still another aspect of the present invention, a radio frequency identification (RFID) system is provided, which includes two or more radio frequency antennas and a generally column-shaped structure. The generally column-shaped structure supports the antennas therein. The generally column-shaped structure includes a hollow and elongated external body portion and two or more antenna support structures. The hollow and elongated external body portion extends along a vertical axis of the generally column-shaped structure. The two or more antenna support structures support the two or more antennas. The two or more antenna support structures are independently pivotable about the vertical axis within the body portion, such that the two or more antennas may be aimed in different directions.

In accordance with another aspect of the present invention, a method of scanning radio frequency identification (RFID) tags is provided. This method includes the following steps described in this paragraph, and the order of steps may vary. 33. A set of items grouped together is passed through a portal. The items have RFID tags associated therewith. A generally column-shaped structure stands at the portal. The generally column-shaped structure includes a hollow and elongated external body portion extending along a vertical axis of the generally column-shaped structure, and a set of radio frequency antennas located within the external body portion. This set of antennas may include any number of antennas (e.g., 3, 4, 6, 8, etc.). The set of antennas is independently pivotable about the vertical axis. As the set of items is passed through the portal, at least part of the set of items is radiated at a first level with radio frequency energy using a first antenna of the set of antennas. The first antenna is positioned at a first angle relative to a reference point about the vertical axis. As the set of items is passed through the portal, at least part of the set of items is radiated at a second level with radio frequency energy using a second antenna of the set of antennas. The second antenna is positioned at a second angle relative to the reference point about the vertical axis. The second level differs from the first level, and the second angle differs from the first angle. As the set of items is passed through the portal, at least part of the set of items is radiated at a third level with radio frequency energy using a third antenna of the set of antennas. The third antenna is positioned at a third angle relative to the reference point about the vertical axis. The third level differs from the first and second levels, and the third angle differs from the first and second angles. The angles of the antennas relative to each other may be adjusted to correspond with the average velocity of the items passing through the portal in relation to the reader sequencing timing, so that each antenna is activated as the set of items is within the beam of that antenna.

In accordance with another aspect of the present invention, a method of controlling radiated power emitted from a radio frequency identification (RFID) system, is provided. This method includes the following steps described in this paragraph, and the order of steps may vary. The RFID system is operated while a generally column-shaped structure of the RFID system is in a first configuration such that radiated power emitted from the RFID system is at or below a predetermined wattage. The structure supports therein an antenna of the RFID system. The structure of the RFID system includes a base portion, a hollow external body portion, and a switch. The hollow external body portion is adapted to extend along a vertical axis and to be supported by the base portion when the structure is in the first configuration such that the antenna is located within the external body portion. The switch is located between the base portion and the external body portion when the structure is in the first configuration. The switch is in a first switch position when the structure is in the first configuration. When operating the RFID system while the structure is in the first configuration and the switch is in the first switch position, power provided to the antenna is above a first predetermined level and below a second predetermined level. The second predetermined level is greater than the first predetermined level. The RFID system is operated while the structure of the RFID system is in a second configuration such that radiated power emitted from the RFID system is at or below the predetermined wattage. In the second configuration, at least part of the external body portion is farther from the base portion along the vertical axis than when the structure is in the first configuration, the switch is in a second switch position, and based upon the switch being in the second switch position, the power supplied to the antenna during the operating of the RFID system is at or below the first predetermined level.

The foregoing has outlined rather broadly features of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which:

FIG. 7 is a perspective view of a first embodiment;

FIG. 8 is a perspective view for some portions of the first embodiment;

FIG. 9A is a top view of a paddle bracket from the first embodiment;

FIG. 9B is a side view of the paddle bracket of FIG. 9A;

FIG. 11 is a side view showing an upper part of the first embodiment;

FIG. 12 is a top view of the first embodiment as taken along line 12—12 in FIG. 11;

FIG. 13 is a perspective view of an RFID system in accordance with a second embodiment of the present invention;

FIG. 14 is a front view of a frame portion for the second embodiment;

DETAILED DESCRIPTION OF ILLUSTRATIVE EMBODIMENTS

Figure 1:
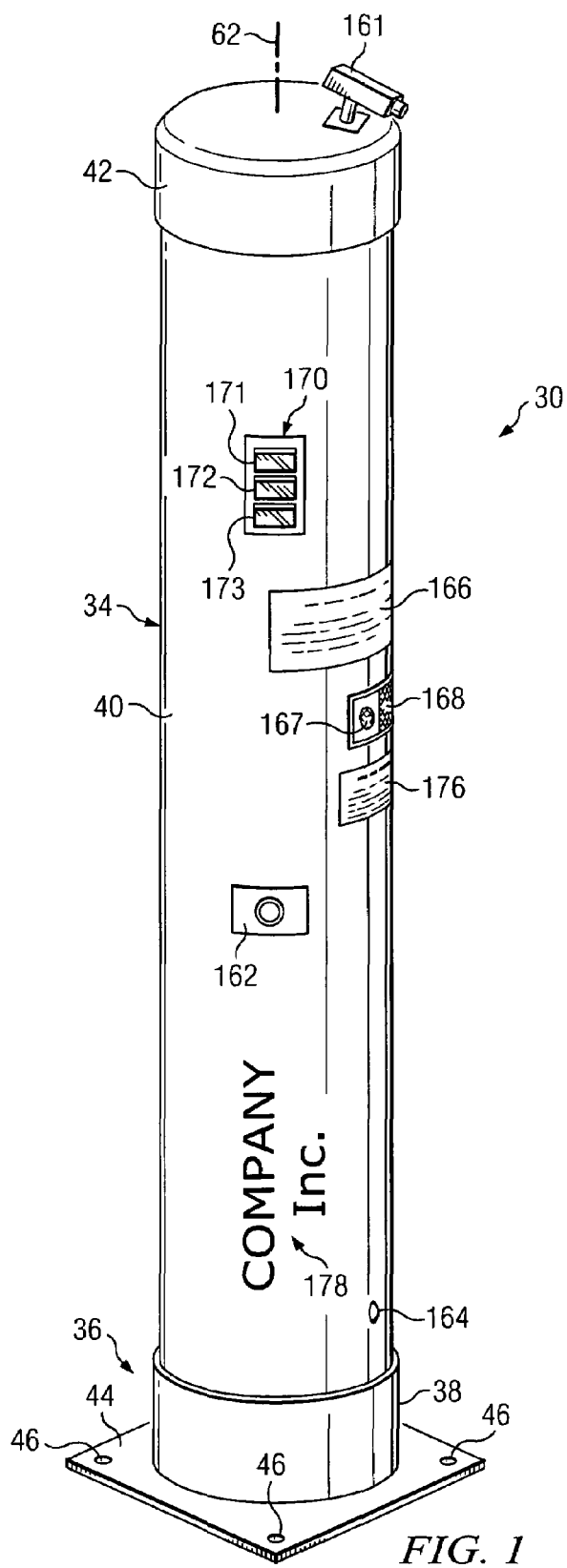
FIG. 1 is a perspective view of an RFID system in accordance with a first embodiment of the present invention.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Figure 2:
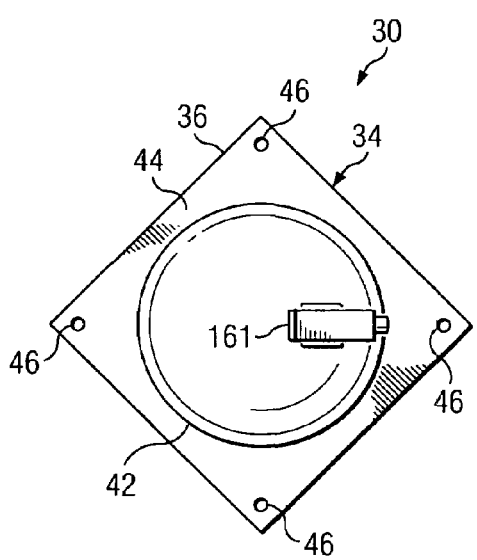
FIG. 2 is a top view of the first embodiment.

FIGS. 1–12 illustrate various views for an RFID system 30 in accordance with a first embodiment of the present invention. FIGS. 1 and 2 show a perspective view and a top view, respectively, of the first embodiment. In FIGS. 1 and 2, a generally column-shaped structure 34 of the RFID system 30 is shown, but some of the components located therein are not shown. There are several exposed components shown in FIG. 1 that are located on the structure 34 and will be discussed further below. The structure 34 of the first embodiment has a base portion 36, a hollow coupler member 38, a hollow and elongated external body portion 40, and a top end cap member 42 (see e.g., FIGS. 1 and 2). The base portion 36 provides the foundation upon which the structure 34 is supported.

Figure 3:
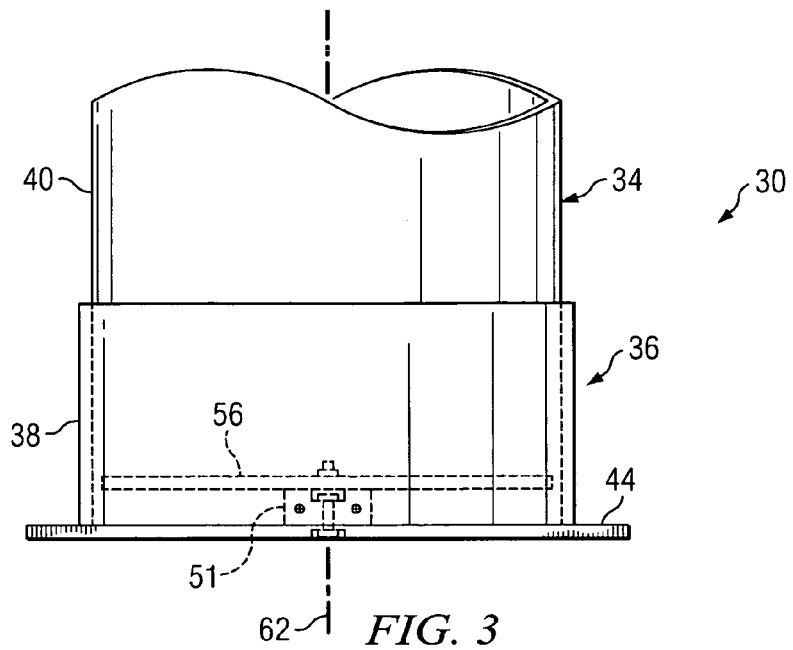
FIG. 3 is a side view showing a lower part of the first embodiment.
Figure 4:
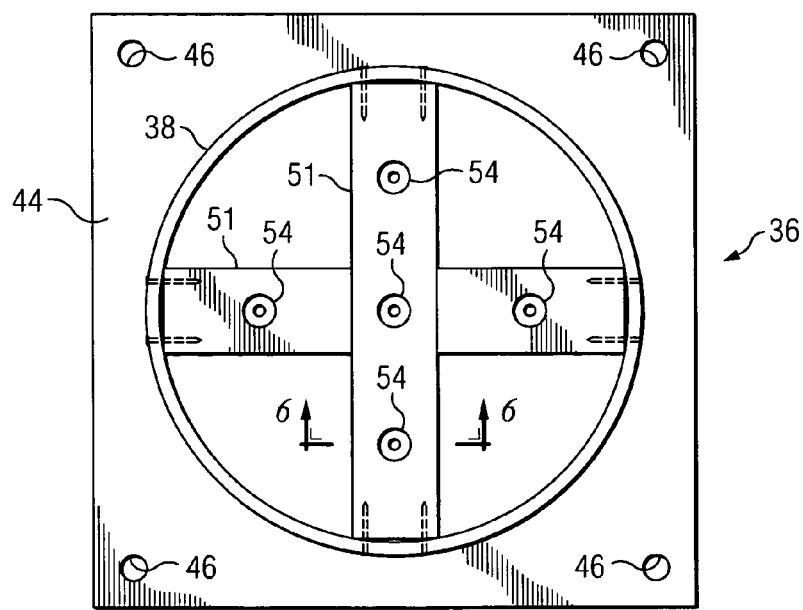
FIG. 4 is a top view of a base portion for the first embodiment.
Figure 5:
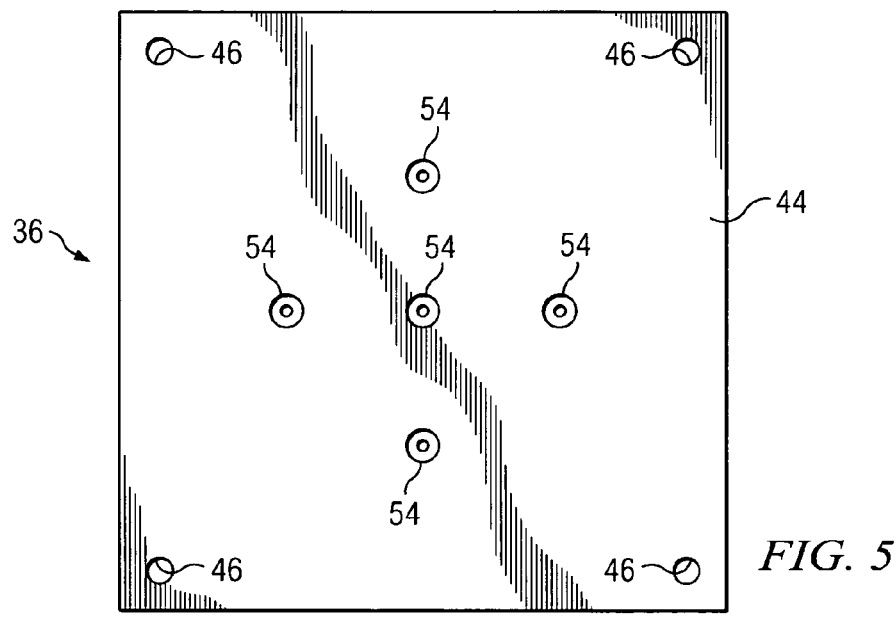
FIG. 5 is a bottom view of the base portion of the first embodiment.

FIGS. 3–6 show more details regarding the base portion 36 of the first embodiment. FIG. 3 is a side view of a bottom portion of the structure 34, with hidden parts of the base portion 36 shown in phantom lines for further illustration. FIG. 4 is a top view of the base portion 36. FIG. 5 is a bottom view of the base portion 36. The base portion 36 of the first embodiment has a base plate portion 44. The base plate portion 44 preferably has holes 46 formed therethrough (see e.g., FIGS. 1, 2, 4, and 5), which may be used to bolt the base portion 36 to a floor, for example. In other embodiments the base plate portion 44 may not have such holes or the holes 46 may be positioned differently. In a preferred embodiment, the base plate portion 44 is formed from 0.5 inch thick steel plate material. In other embodiments, however, the base plate portion 44 may be made from any of a variety of suitable materials, including (but not limited to): wood, bonded particulate wood, paper, other metals, plastic, nylon composite, PVC, fiberglass composite, carbon-fiber composite, Kevlar composite, and combinations thereof, for example. In the first embodiment, the base plate portion 44 is square with a width between about 20 inches and about 24 inches, as is currently preferred. In other embodiments, the thickness, shape, and dimensions of the base plate portion may vary.

Figure 6:
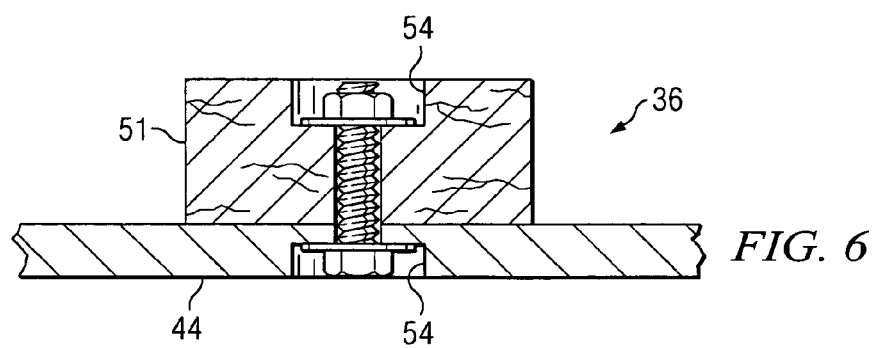
FIG. 6 is a cross-section view of the base portion as taken along line 6—6 in FIG. 4.

As best shown in FIG. 4, the base portion 36 of the first embodiment has two cross members 51 that are bolted to the base plate portion 44. FIG. 6 is a cross-section view of the base portion 36 as taken along line 6—6 in FIG. 4. As shown in FIG. 6, it is preferred to provide countersinks 54 for the bolts used in fastening the cross members 51 to the base plate portion 44. The countersinks 54 on the bottom of the base plate portion 44 are shown also in FIG. 5. Providing the countersinks 54 on the bottom of the base plate portion 44 allows the base plate portion 44 to sit flush on a flat floor surface to provide more stability for the structure 34 (i.e., more surface area of the base portion in contact with the floor). The countersinks 54 in the top of the cross members 51 are also shown in FIG. 4. In FIG. 3, a bottom support disc 56 for the frame portion 60 is shown rotatably coupled to the base portion 36 by a bolt through the center of the cross members 51 (and through the center of the base plate portion 44). The frame portion 60 is not shown in FIG. 3, but is shown in other figures (see e.g., FIGS. 7 and 8) and will be discussed further below. This bottom support disc 56 has a round disc shape (from a top view) and is preferably permitted to be rotated relative to the base portion 36. The bottom support disc 56 sits on the cross members 51 and is vertically supported by the cross members 51. Hence, the countersinks 54 in the top of the cross members 51 allow the bottom support disc 56 to sit flush on the cross members 51, which enhances the support provided by the cross members 51 to the bottom support disc 56 (i.e., maximizing surface area of contact between the disc 56 and the cross members 51).

The cross members 51 of the first embodiment are made from wood and preferably have a height of about 1.5 inches and a width of about 3.5 inches (i.e., "2-by-4" stud material). In other embodiments, the cross members 51 may be formed from a single piece or from more than two pieces. Also, the materials used for making the cross members 51 may be any suitable material, including (but not limited to): wood, paper, metal, plastic, nylon composite, PVC, and combinations thereof, for example. The overall of shape and dimensions of the cross members 51 may vary as well. It is preferred to retain some open space between the bottom support disc 56 and the base plate portion 44, as this space may be used for routing wires and/or cables through the structure 34. The bottom support disc 56 in the first embodiment is made from 0.5 inch thick medium density particle board (i.e., wood particulate-glue composite) and has a diameter of about 14.5 inches. In other embodiments, the thickness, shape, and dimensions of the bottom support disc 56 may vary, and the bottom support disc 56 may not be present in some embodiments (not shown). The bottom support disc 56 may be made from any of a variety of suitable materials, including (but not limited to): wood, paper, metal, plastic, nylon composite, PVC, and combinations thereof, for example.

In the first embodiment, a hollow coupler member 38 is attached to the base portion 36 (see e.g., FIGS. 1, 3, and 4). The coupler member 38 is preferably fastened to the cross members 51 by screws (e.g., deck screws), as shown in FIG. 3. In other embodiments, the coupler member 51 may be attached to and retained in relationship with the base portion 36 in other ways (not shown), and the coupler member 38 may not be used in some embodiments (not shown). In the first embodiment, the coupler member 38 is made from 0.5 inch thick PVC with an outside diameter of about 17 inches. The coupler member 38 may be fabricated from a standard PVC sewer pipe coupler, for example. The coupler member 38 may be made from any of a variety of suitable materials, including (but not limited to): PVC, plastic, nylon composite, wood, paper, metal, fiberglass composite, carbon-fiber composite, Kevlar composite, and combinations thereof, for example. In the first embodiment, the external body portion 40 is adapted to fit within the coupler member 38, as shown in FIGS. 1 and 3. Hence in such case, the base portion 36 supports the external body portion 40 with the aid of and via the coupler member 38, and the coupler member 38 is supported by the base portion 36. The coupler member 38 may be considered part of the base portion 36.

Referring FIGS. 1–3, the hollow and elongated external body portion 40 extends along a vertical axis 62 of the structure 34 and is supported by the base portion 36. In the first embodiment, the external body portion 40 is formed from standard PVC sewer pipe having an outside diameter of about 16 inches and having a thickness of about 0.5 inch. Such PVC pipe is rugged, durable, and inexpensive. In other embodiments, the external body portion 40 may be made from other suitable materials, including (but not limited to): plastic, nylon composite, wood, paper, metal, fiberglass composite, carbon-fiber composite, Kevlar composite, and combinations thereof, for example. The external body portion 40 of the first embodiment has a cross-section shape perpendicular to the vertical axis 62 that is circular (see e.g., FIG. 2), which is preferred. As discussed in more detail below, it is desirable to have the ability to rotate or pivot the frame portion 60 about the vertical axis 62 for tuning the system 30. This may be useful where the base portion 36 has limited attachment positions to a floor and the frame portion 60 needs to be positioned at a different angle than the base portion 36. Also, this provides a greater flexibility in installing the RFID system 30 and may make it easier to tune the system. Thus, the circular cross-section shape may provide the most flexibility for positioning the frame portion 40 about the vertical axis 62 with respect to the base portion 36. In other embodiments (not shown), the range of rotational movement needed for the frame portion 60 relative to the base portion 36 may be limited, the frame portion 60 may be fixed in position (i.e., rotating the entire structure 34 to adjust angle about vertical axis), or there may not be a need for a frame portion 60, for example. Hence, the cross-section shape of the external body portion 40 in other embodiments may be selected from a variety of shapes, including (but not limited to): a circle, an oval, an ellipse, a polygon, a rectangle, a square, a hexagon, an octagon, an arbitrary shape, and combinations thereof. The cross-section shape of the external body portion 40 need not be uniform along the vertical axis 62.

As will be apparent from this disclosure, some of the main purposes served by the external body portion 40 may include (but are not necessarily limited to): providing protection for equipment within the structure, hindering or preventing movement of RF antenna(s) within the structure to maintain tuned position(s), protecting equipment within the structure from the environment, protecting equipment within the structure from pests (e.g., mice, rats, bugs) or animals (e.g., birds, squirrels), or combinations thereof, for example.

In the first embodiment, the external body portion 40 may not need any bolts, screws, or adhesive to hold it in place. The interfit between the external body portion 40 and the coupler member 38 may be sufficient to support the external body portion 40 (e.g., friction fit). In such case, the external body portion 40 may be removed without the use of tools. For some applications, it may be desirable to apply a sealant (e.g., silicon caulk) in the crack where the external body portion 40 and the coupler member 38 are fitted together to keep liquid and/or bugs from entering the interior of the structure 34. As another alternative, tape or shrink wrap material may be applied over the crack. The structure 34 may be partially or completely sealed. Also, depending upon the options and features of an embodiment (e.g., external cameras, access doors, external speakers, external displays, etc.), the level of sealing achievable by an embodiment may vary. A structure 34 of an embodiment may be sealed sufficiently to withstand conditions such as: rain, water splashing, hose down, dust, indoor use, outdoor use, covered outdoor use, and possibly other environments where RFID tagging may be used. In accordance with NEMA Enclosure Type standards published by the National Electrical Manufacturers Association (NEMA), an embodiment of the present invention may be configured and designed to meet various levels of protection under NEMA standards. For example, an embodiment of the present invention may achieve a NEMA Enclosure Type rating up to Type 4, Type 5, Type 12, or combinations thereof.

Typically, it will be desirable to have the external body portion 40 removably attached to the base portion 36 so that the internal components may be accessed for maintenance or tuning the system 30. In some applications, however, it may be desirable to permanently attach the external body portion 40 to the base portion 36 (e.g., using an adhesive). In either case, an embodiment may further include one or more access doors (see e.g., FIG. 28 discussed below) formed in the external body portion 40 for providing access to components therein.

As shown in FIGS. 1 and 2, a top end cap member 42 is removable attached to the external body portion 40 in the first embodiment. FIG. 11, which will be discussed further below, illustrates how the top end cap member 42 may fit over the top end of the external body portion 40, both shown in phantom lines. Having a removable top end cap member 42 may be advantageous for accessing equipment within the structure 34 without the need for removing the external body portion 40 from the base portion 36. In the first embodiment, the top end cap member 42 is a standard PVC sewer pipe end cap adapted to fit on PVC pipe with a 16 inch outside diameter. Again, such PVC material is rugged, durable, easy to obtain, and inexpensive. In other embodiments, the top end cap member 42 may be made from other suitable materials, including (but not limited to): plastic, nylon composite, wood, paper, metal, fiberglass composite, carbon-fiber composite, Kevlar composite, and combinations thereof, for example. Although the top end cap member 42 of the first embodiment is adapted to fit over the top end of the external body portion 40, in other embodiments (not shown) the top end cap member 42 may be configured differently. For example, the top end cap member 42 may be adapted to fit inside the top end of the external body portion 40. The top end cap member 42 in the first embodiment is hollow, but in other embodiments (not shown) it may not have a hollow configuration. In another embodiment (not shown), the top end cap member 42 may be an integral part of the external body portion 40, rather than a separate piece. Furthermore, in other embodiments, the top end cap member 42 may be permanently attached to the external body portion 40 (e.g., using an adhesive).

FIG. 7 is a perspective view of the first embodiment showing in phantom lines a frame portion 60, paddle portions 68, and radio frequency antennas 70 located within the external body portion 40 of the structure 34. These internal components are shown alone in FIG. 8. The frame portion 60 extends along the vertical axis 62 of the structure and is supported by the base portion 36. For the first embodiment, the frame portion 60 is bolted to the bottom support disc 56 and this assembly is adapted to rotate or pivot about the vertical axis 62 with respect to the base portion 36. In the first embodiment, the frame portion 60 is made from aluminum angle material, which may be welded and/or bolted together, for example. The frame portion 60 may be made from any of a variety of suitable materials, including (but not limited to): metal, plastic, wood, paper, PVC, nylon composite, fiberglass composite, carbon-fiber composite, Kevlar composite, and any combination thereof, for example. Also, the layout and design of the frame portion 60 may vary from that shown in the first embodiment.

The paddle portions 68 are pivotably coupled to the frame portion 60. In the first embodiment, each paddle portion 68 is adapted to pivot about a horizontal axis 72, and an aluminum tube 74 extends horizontally along the horizontal axis 72. The aluminum tube 74 is attached to the paddle portion 68 and pivots with the paddle portion 68. Brackets 76 extend from the frame portion 60 and these brackets 76 have holes 78 formed therein, which are adapted for accepting the aluminum tube 74 therein (see e.g., FIG. 8). FIGS. 9A and 9B show a bracket 76 from the first embodiment in more detail. FIG. 9A is a top view of the bracket 76 along with a cross-section part of the frame portion 60. FIG. 9B is an end view of the bracket 76 of FIG. 9A. In the first embodiment, the length of the aluminum tube 74 attached to the paddle portion 68 is about the same as or just slightly longer than the width of the frame portion 60. This is a preferred configuration because it allows the paddle portion 68 to be removed from the brackets 76 easily for maintenance. Also, the distance P between the frame portion 60 and the pivot axis 72 of the paddle portion 68 may be optimized to allow for a larger range of pivotal movement of the paddle portion 68 with respect to the frame portion 60 and the interior walls of the external body portion 40. In a preferred embodiment, for example, this distance P may be about 2 5/16 inches (2.3125 inches).

The paddle portion 68 may be made from any of a variety of suitable materials, including (but not limited to): acrylic, plastic, wood, paper, metal, fiberglass composite, carbon-fiber composite, Kevlar composite, and combinations thereof, for example. Likewise, the tube 74 attached to the paddle portion 68 may be made from a variety of suitable materials, including (but not limited to): acrylic, plastic, wood, paper, metal, fiberglass composite, carbon-fiber composite, Kevlar composite, and combinations thereof, for example. Also, in other embodiments, the paddle portion 68 may be pivotably coupled to the frame portion 60 in other ways. In a preferred embodiment, the paddle portions 68 have dimensions allowing them to retain a wide variety of commercially available antennas 70. Typically, the diameter of the external body portion 40 will be determined by or dependent upon the size of the paddle portions 68 (and width of frame portion 60), which in turn typically depends on the size of the antennas 70 available or being used for a given application. For example, a preferred size of a paddle portion 68 may be about 12 inches by about 12 inches. It is also preferred to have the paddle portion 68 predrilled for multiple attachment points of multiple makes and models of antennas 70. The RFID system 30 may be sold as a kit with just the structure 34 (e.g., base portion 36, external body portion 40, frame portion 60, and paddle portions 68), so that the customer can install most any antennas 70 and electrical components therein to complete the system 30.

Figure 10A:
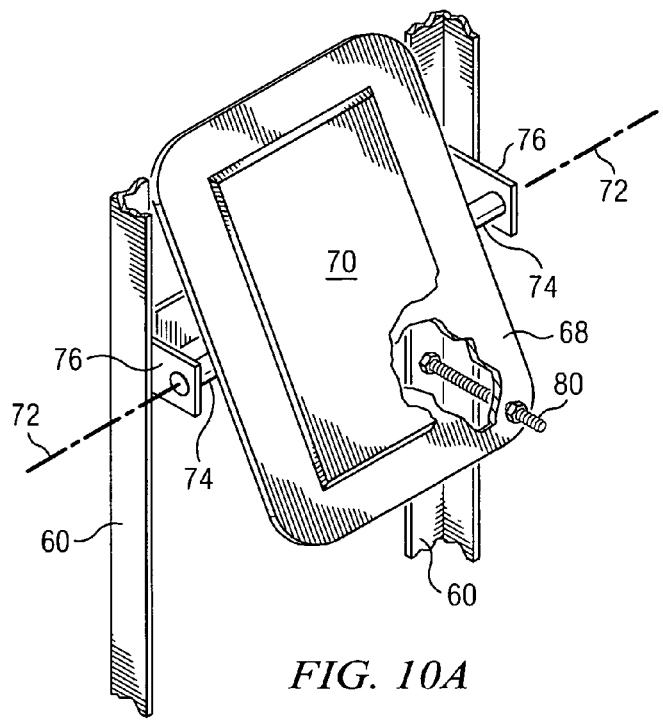
FIGS. 10A and 10B are perspective views showing two variations for paddle portions.
Figure 10B:
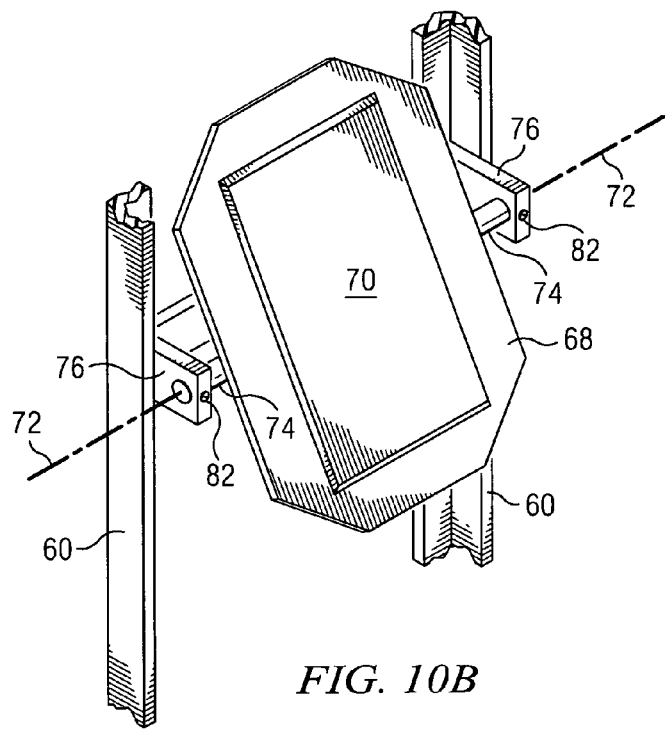

In FIG. 8, an RFID antenna 70 is attached to each paddle portion 68. The wires/cables for the antennas 70 are not shown for purposes of simplifying the figures. Typically, it will be desirable to lock the position of the paddle portion 68 while or after tuning the system 30. FIGS. 10A and 10B illustrate two ways, among many, that may be used to retain the position of the paddle portion 68 with respect to the frame portion 60.

In FIG. 10A, an adjustable-length member 80 (a threaded rod with nuts in this case) extends between the paddle portion 68 and the frame portion 60 to retain the position of the paddle portion 68. By varying the length of the member 80, the angle of the paddle portion 68, relative to the frame portion 60, may be varied. The paddle portion 68 shown in FIG. 10A is essentially the same as that of the first embodiment (see FIG. 8), except that the paddle portion 68 is generally rectangular-shaped with round corners. This configuration of the paddle portion 68, with round corners, may be preferred to allow a greater range of pivotal movement of the paddle portion 68, where the paddle portion 68 abuts against the frame portion 60 and/or the inside of the external body portion 40 at the limits of the pivotal movement range.

In FIG. 10B, a set screw 82 extends through part of the frame portion 60 to engage against the tube 74 of the paddle portion 68, and thus retaining the pivotal position of the paddle portion 68 relative to the frame portion 60. In FIG. 10B, the frame portion 60 is made of solid plastic, the paddle portion 68 and its tube 74 are made from plastic, and the paddle portion 68 has an octagonal shape. Hence, the paddle portion 68 may have a variety of shapes, including (but not limited to): rectangular, generally rectangular with rounded corners, octagonal, polygonal, arbitrarily shaped, and combinations thereof, for example.

FIG. 11 shows a side view for a top portion of the system 30 of the first embodiment with the external body portion 40 and the top end cap member 42 shown in phantom lines. Multiple tiers of horizontal platforms 88 are attached to the top of the frame portion 60 in FIG. 11. These platforms 88 may be considered part of the frame portion 60 of the structure 34. Electrical components 90 are shown in FIG. 11 being supported by the platforms 88. The electrical components 90 may include a computer system (e.g., processor(s), memory storage device(s)), a wireless communication device, an RFID reader device, a battery, or combinations thereof, for example. Some or all of the electrical components 90 for the system 30 (other than the antennas 70) may be located on the platforms 88. The placement of the electrical components 90 at the top of the frame portion 60 and on these platforms 88 may be advantageous for maintenance because they may be accessed by simply removing the top end cap member 42, rather than having to remove the external body portion 40. The electrical components 90 of the system 30 may be positioned anywhere within the external body portion 40 for other embodiments and applications. FIG. 12 is a sectional top view of FIG. 11 as taken along line 12—12. FIG. 12 shows that the platforms 88 are preferably round, but the platforms 88 may have other shapes in other embodiments. A series of poles 94 may be used to support one platform 88 upon on another platform 88 (see FIGS. 11 and 12). These poles 94 also may be considered part of the frame portion 60 of the structure 34.

The electrical components 90 used in an embodiment of the present invention may vary for different applications. In a preferred embodiment, the RFID system embodiment 30 includes a computer system and a wireless communication system for communicating data and information to a remotely located computer system. In some applications, vendors or other users of the RFID system 30 may be using a hand-held wireless unit (not shown). In such cases, the RFID system 30 embodiment may have the capability to communicate with the user's hand-held unit. Also in a preferred embodiment, the only wire coming out of the structure 34 (e.g., at the base of the structure) is a power cord for plugging into a typical 110 V wall outlet. Hence in such case, the electrical power to the system 30 is all that is needed for installing the RFID system 30 and there is no need to route wires for communicating the data to and from the RFID system 30. It may be required to encase the power cord, and/or other wires from the RFID system 30, in a conduit (not shown) to meet building and/or safety code requirements.

The RFID system 30 may be "smart" (i.e., having most or all of the computer hardware and/or software within the external body portion 40 for driving the functions of the RFID system 30. Alternatively, the RFID system 30 may rely on a nearby computer system (e.g., in an office, workstation, or kiosk) to provided some or all of the control, data storage, and/or other computations and functions.

In some applications, a warehouse or storage facility may not have electricity for the building. In such case the RFID system 30 may have a connection socket or a wire extending therefrom (not shown) adapted to be electrically connected to a vehicle (e.g., delivery truck) so that the RFID system 30 may be powered by the vehicle while the RFID system 30 is being used.

In some applications, it may be desirable to have a redundancy for the antennas 70. The first embodiment is an example application of the present invention with dual antennas 70 for redundancy. For example, only one set of antennas 70 may be used at a time to avoid interference between the sets of antennas 70. The first embodiment may also be used in an application where the transmitting antenna is separate from the receiving antenna (e.g., pitch-catch configuration), i.e., a transmitting antenna on one paddle portion and a corresponding receiving antenna on another paddle portion.

FIG. 13 is a perspective view of a second embodiment of the present invention. The frame portion 60, paddle portions 68, and antennas 70 are shown in phantom lines in FIG. 13, as they are located within the structure 34. The second embodiment is essentially the same as the first embodiment, except that redundant antennas 70 are not used. FIG. 14 is a front view showing part of the frame portion 60 for the second embodiment. There are many configurations of antennas and readers for use in RFID systems. In some configurations, the antenna 70 is a separate unit than the reader and they are electrically coupled via wires or cable(s). In the second embodiment, an antenna and a reader are built into a same unit 70, and each paddle portion 68 has one antenna/reader unit 70 attached thereto. This may be a preferred configuration because there is no concern about the wire length between the antenna and the reader. When the antenna is housed in a unit separate from its corresponding reader, it is usually desirable to minimize the wire length between the antenna and the reader to provide the best performance.

Figure 15:
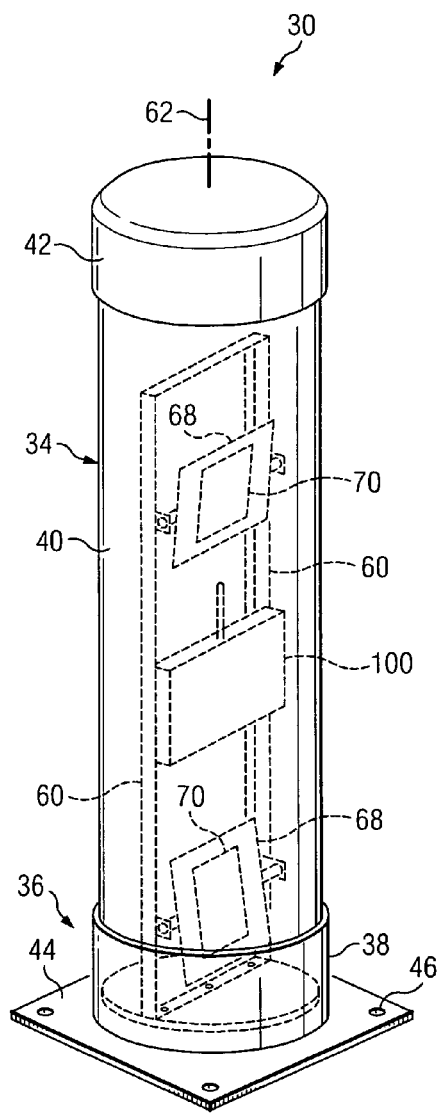
FIG. 15 is a perspective view of an RFID system in accordance with a third embodiment of the present invention.
Figure 16:
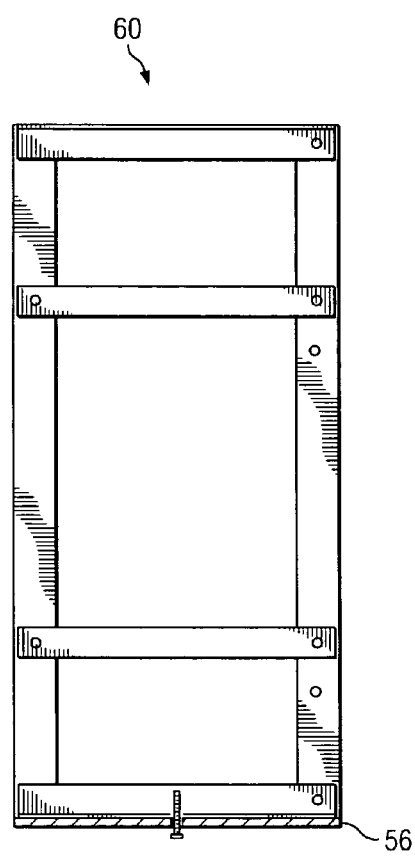
FIG. 16 is a front view of a frame portion for the third embodiment.

FIG. 15 is a perspective view of a third embodiment of the present invention. The frame portion 60, paddle portions 68, reader 100, and antennas 70 are shown in phantom lines in FIG. 15, as they are located within the structure 34. In the third embodiment, the antennas 70 are housed separately from the reader 100. In this case, a single reader unit 100 is used for both antennas 70. In such case, it is preferred to mount the reader 100 in a central location (see FIG. 15). This prevents the case where one antenna 70 is connected to the reader 100 by a much longer cable than that of another antenna 70, which may cause difficulties in tuning the system 30 and/or a worse performance for the antenna 70 more distant from the reader 100. FIG. 16 is a front view showing part of the frame portion 60 for the third embodiment. The third embodiment also illustrates that the height of the structure 34 and number of antennas 70 used may vary for different embodiments to suit different applications. For example, if only pallets are going to be read by the system 30, a shorter structure 34 with fewer antennas 70 may suffice. And if the system 30 will be used only to scan RFID tags on hand carts and/or pallets, then a mid-height structure 34, such as the third embodiment shown in FIG. 15, may be sufficient for the application. Preferably, the first embodiment has a total height for the structure 34 of about 108 inches (i.e., typical dock door height), but other heights may be used. A preferred height for the third embodiment has a total height for the structure 34 of about 78 inches, and again, other heights may be used. A preferred height for a shorter structure 34 (e.g., for reading pallets) may be about 34 inches, for example. With benefit of this disclosure, one of ordinary skill in the art will realize that there are a wide variety of dimensions and variations that an embodiment may have.

Figure 17:
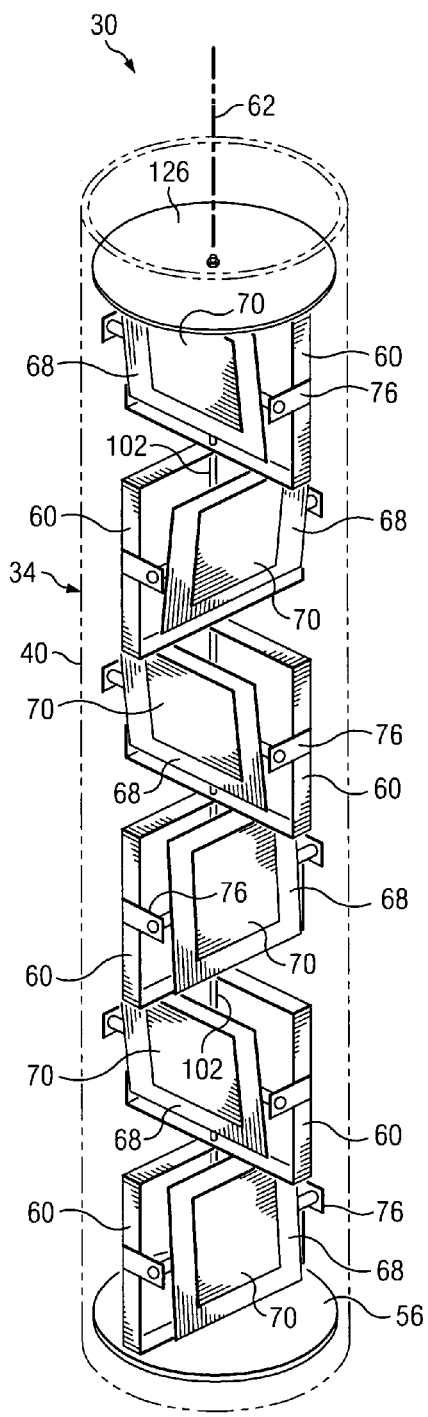
FIG. 17 is a perspective view showing part of an RFID system in accordance with a fourth embodiment of the present invention.
Figure 18:
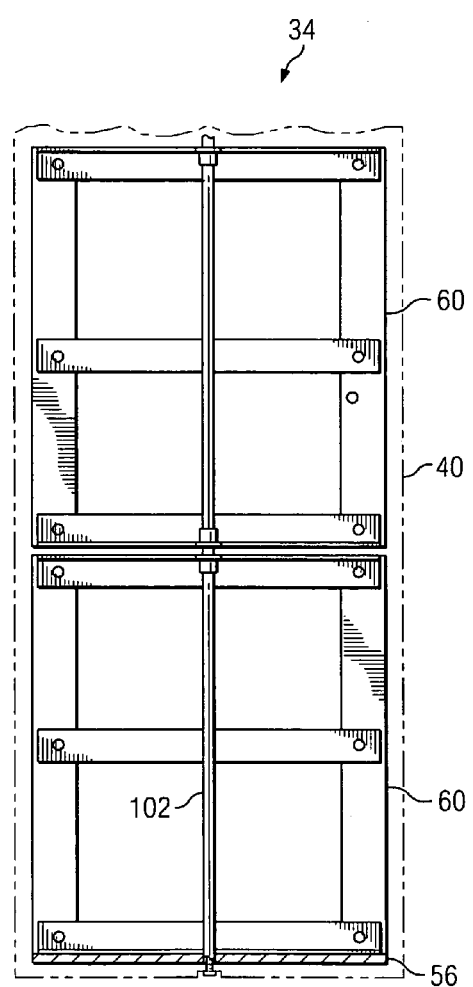
FIG. 18 is front view for a lower part of a frame portion for the fourth embodiment.

FIG. 17 is a perspective view showing part of a fourth embodiment of the present invention. The fourth embodiment provides multi-directional (e.g., bi-directional) reading capabilities about the vertical axis 62. A portion of the external body portion 40 is shown in phantom lines in FIG. 17 and other portions of the fourth embodiment, which may be the same as on the first embodiment, are not shown for purposes of simplifying the drawings. In the fourth embodiment, each paddle portion 68 has its own frame portion 60, and each of the frame portions 60 is adapted to pivot independently about the vertical axis 62. FIG. 18 shows an enlarged front view for two frame portions 60 of the fourth embodiment to illustrate the frame portions 60 in more detail. Preferably, the fourth embodiment has a single shaft or rod 102 that extends along the vertical axis 62 and couples the stack of frame portions 60 together. In other embodiments, however, there may not be a need for the rod 102 where one frame portion 60 is rotationally coupled to an adjacent frame portion 60 in another way (e.g., a bearing member).

Figure 19:
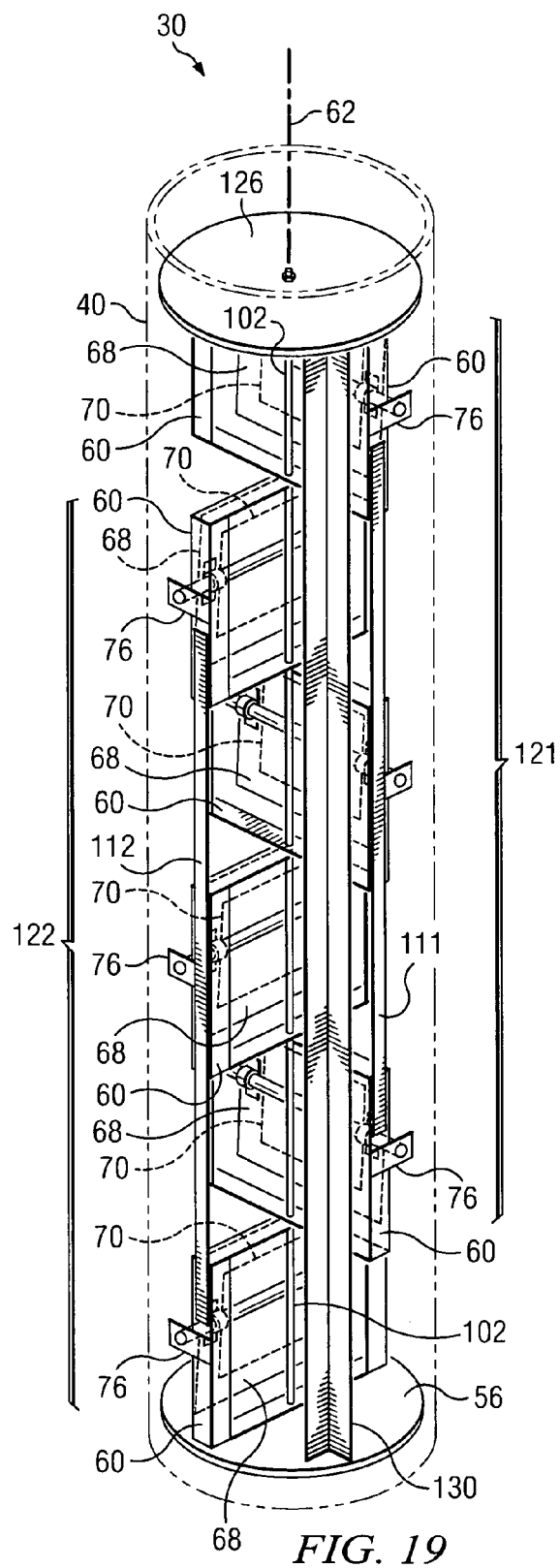
FIG. 19 is a perspective view showing part of an RFID system in accordance with a fifth embodiment of the present invention.

FIG. 19 is a perspective view showing part of a fifth embodiment of the present invention. The fifth embodiment provides bi-directional reading capabilities about the vertical axis 62. A portion of the external body portion 40 is shown in phantom lines in FIG. 19 and other portions of the fifth embodiment, which may be the same as on the first embodiment, are not shown for purposes of simplifying the drawings. The fifth embodiment is similar to the fourth embodiment shown in FIGS. 17 and 18. But in the fifth embodiment, vertically extending frame-connecting members 111, 112 are used to link two or more frame portions 60 together. In FIG. 19, for example, a first set 121 of frame portions 60 are linked together by a first frame-connecting member 111, where the first set 121 of frame portions 60 retain a first set of antennas 70 directed toward a first direction. And, a second set 122 of frame portions 60 are linked together by a second frame-connecting member 112, where the second set 122 of frame portions 60 retain a second set of antennas 70 directed toward a second direction (the second direction being different than the first direction). The first set 121 of frame portions 60 may pivot about the vertical axis 62 with respect to the second set 122 of frame portions 60, the base portion 36, and the support discs 56, 126. Similarly, the second set 122 of frame portions 60 may pivot about the vertical axis 62 with respect to the first set 121 of frame portions 60, the base portion 36, and the support discs 56, 126. Also in the fifth embodiment, an extra support member 130 extends between and ties together an upper support disc 126 and a bottom support disc 56. Hence, the first set 121 of frame portions 60 may be pivoted together about the vertical axis 62 and the second set 122 of frame portions 60 may be pivoted together about the vertical axis 62. This may make it easier to tune the system 30. Also, these frame-connecting members 111, 112 and the extra support member 130 provide more structural stability for the frame portions 60.

Figure 20:
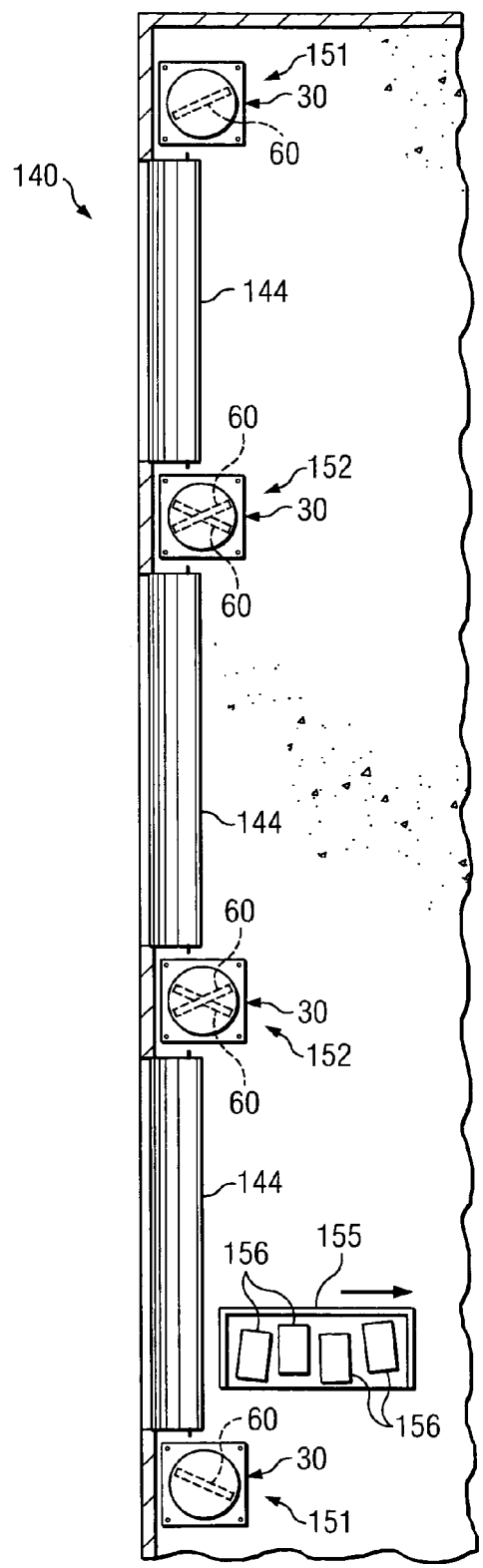
FIG. 20 is a top view for a warehouse application of several embodiments of the present invention.

FIG. 20, illustrates an example use of embodiments of the present invention in a warehouse environment. A portion of a warehouse 140 is shown in top view in FIG. 20. The warehouse 140 has multiple dock doors 144, which may be used for loading and unloading trucks with goods, for example. In this example application shown in FIG. 20, both single direction RFID system embodiments 151 and multi-directional RFID system embodiments 152 are used. An advantage of a multi-directional or bi-directional reading embodiment 152 (e.g., fourth and/or fifth embodiment) is that one RFID system 30 of the present invention may be placed between two dock doors 144 (see FIG. 20) and provide reading of items coming through either or both adjacent doors 144. Another advantage of an embodiment of the present invention is that an embodiment preferably has a small footprint area (e.g., 20 inches by 20 inches) so that the RFID system 30 is non-obtrusive and consumes little space. In FIG. 20, a cart 155 with tagged products 156 thereon is shown being moved past one of the RFID system embodiments 151.

Figure 21:
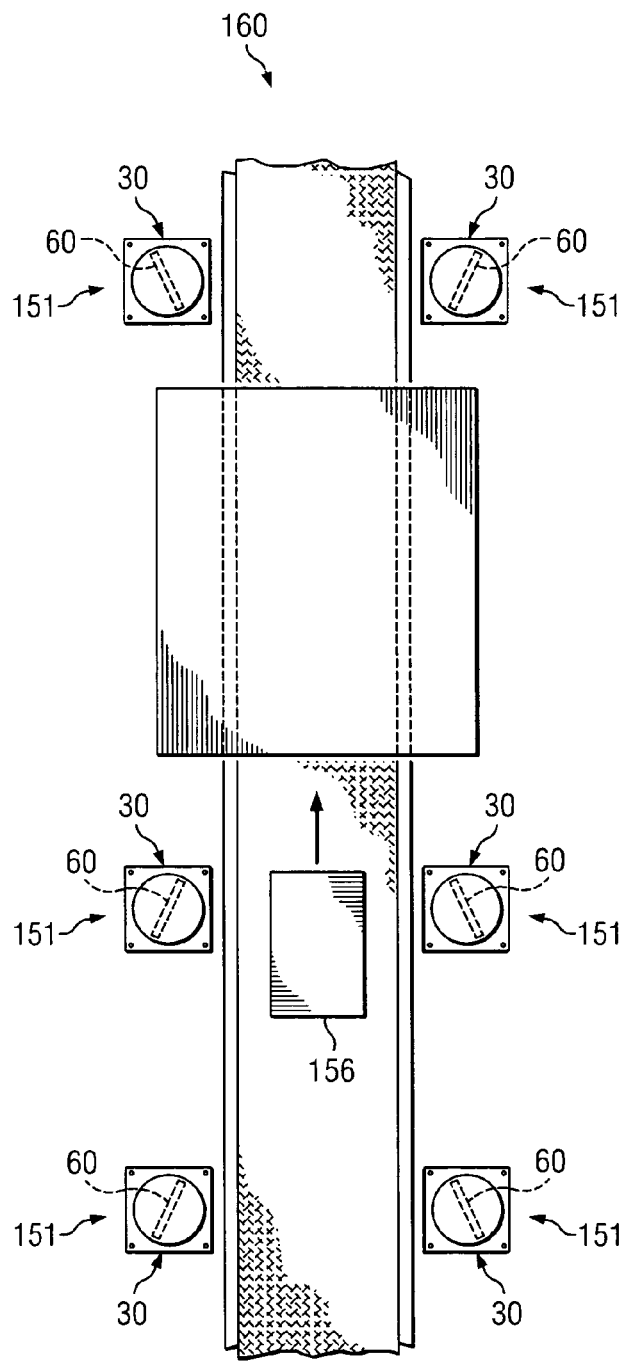
FIG. 21 is a top view for a conveyor system implementing embodiments of the present invention.
Figure 22A:
FIGS. 22A–22J show a variety of illustrative cross-section shapes that may be used for an external body portion in an embodiment of the present invention.
Figure 22B:
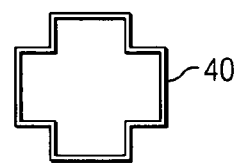
Figure 22C:
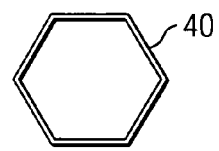
Figure 22D:
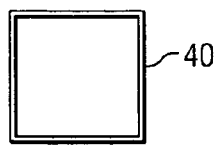
Figure 22E:
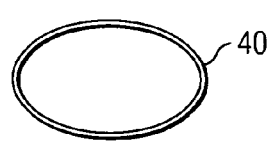
Figure 22F:
Figure 22G:
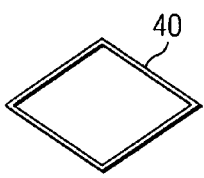
Figure 22H:
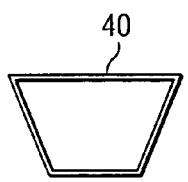
Figure 22I:
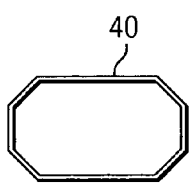
Figure 22J:
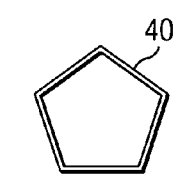

FIG. 21 illustrates another example use of an embodiment of the present invention. FIG. 21 shows a top view for a portion of a conveyer system 160. Such conveyer system 160 may be part of a production line and/or part of a sorting system. A tagged product 156 is shown moving along the conveyer system 160 in FIG. 21. As the product 156 moves along the conveyer system 160, it moves past RFID system embodiments 151 of the present invention. Although only single directional embodiments 151 are shown in FIG. 21, multi-directional systems may be used as well. Thus, as a tagged product 156 moved past an RFID system embodiment 151, the product tag may be scanned/detected and read by the system to identify and track the product or item moving along the conveyer system 160.

Referring again to FIGS. 1 and 2, the first embodiment is shown with numerous communication systems attached thereto for use in communicating to persons using the RFID system 30. None or any combination of these communication systems may be incorporated into an embodiment of the present invention. As shown in FIGS. 1 and 2, the first embodiment has a first video camera 161 mounted on top of the top end cap member 42. This first camera 161 may be used to monitor persons using the RFID system 30 and/or the environment near the RFID system. Camera(s) of the RFID system 30 also may be used for security purposes.

The first embodiment also has motion detector 164 for sensing movement near or at the RFID system 30 The motion detector 164 may be useful in an application where the RFID system 30 is only needed a few times per day or per week, for example, so that the RFID system 30 may conserve energy and other resources (e.g., memory, video recording media). The motion detector 164 also may be used to activate certain components of the RFID system 30 or the entire RFID system 30. For example, the first camera 161 may only record when a person or object triggers the motion detector 164 to save on video image storage.

Still referring to FIGS. 1 and 2, the first embodiment has a second video camera 162 located at about a waist height (e.g., about 34 inches from floor), for example. The second video camera 162 is preferably able to capture more details (e.g., for use in dealing with returns and/or open cartons) than the first camera 161. The interaction between the user and the RFID system 30 may be fully automated (no interaction with a person and/or the actions being recorded for later review) or the user may interact with a person at a remote location using the communication systems provided on the RFID system 30 (e.g., microphone, speaker, camera, touch screen, mouse, stylus, keyboard), for example. As an example, the second video camera 162 may be used to capture images of the contents of a box presented before the second camera 162. Thus, the RFID system 30 of an embodiment may aid in or provide the means for an unattended (fully automated) check-in/check-out facility. A camera used in an embodiment may be analog, digital, motion, still, color, black-and-white, infrared, or combinations thereof, for example. Another communication system that may be used in an embodiment is an electronic display screen 166 (see e.g., FIG. 1). A display screen 166 may be used to communicate messages to persons using the RFID system 30, as it may display various things (e.g., text messages, numbers, codes, images, logos, or combinations thereof). The display screen 166 may be any of a variety of suitable display screens, including (but not limited to): a multiple LED display screen for static or scrolling messages, a computer monitor, an LCD, a thin panel computer screen, a CRT, a touch sensitive screen, or a television, for example. In FIG. 1, a curved scrolling text multiple LED screen is used for the display screen 166, for example. The display screen 166 may be useful, for example, in applications where multiple vendors will be interacting with and using the RFID system 30. The display screen 166 may be useful in communicating to the user that the RFID system 30 recognizes the vendor's identification and/or vendor's status or level of automated check-in capability.

The first embodiment also includes a microphone 167 and a speaker 168 for providing audible communications to a person (see FIG. 1) (e.g., communicating with a person at a remote location, providing voice prompts to the user from the RFID system 30). The first embodiment also has indicator lights 170 with multiple colors (e.g., red 171, yellow 172, and green 173), which may be used to provide signals to a user of the RFID system 30. For example, a green light 173 lit may be used to communicate to a user that the system 30 is ready. A yellow light 172 lit may be used to communicate that the user can perform the delivery but a manual reconciliation must be performed. And, a red light 171 lit may be used to communicate that the user that must contact a receiving clerk and have products manually checked, for example. Other colored lights and other numbers of indicator lights 170 may be used in other embodiments (not shown), and other meanings may be assigned to the indicator lights 170.

As shown in FIG. 1, a sign 176 or signs posted on the external body portion 40 may be used to communicate advertisements, announcements, messages, notices, instructions, and/or warnings to users, for example. Furthermore, stickers and/or banners attached to an outside of the RFID system 30 may be used to communicate advertisements, announcements, messages, notices, instructions, and/or warnings to users, as another example communication system. Also, logos, advertisements, announcements, messages, notices, instructions, and/or warnings may be printed and/or painted on an outside of the RFID system 30. For example, a sticker 178 with a company logo is shown attached to the external body portion 40 of the first embodiment in FIG. 1.

Even though not shown in the figures, material (e.g., EMF absorptive foam material) with the ability to absorb radio frequencies used by the RFID system 30 may be included within the external body portion 40 (e.g., behind and/or between antennas 70) to reduce unwanted reflections of signals. For example, certain absorptive materials may provide about a 20 dB drop in the RF waves that impinge upon the absorptive material (e.g., to reduce or minimize unwanted backlobes and/or unwanted reflections).

Although the illustrative embodiments shown in FIGS. 1–21 have an external body portion 40 with a cross-section shape (perpendicular to the vertical axis 62) that is circular, the cross-section shape of the external body portion 40 may have any of a wide variety of suitable or desired shapes. FIGS. 22A–22J show some illustrative cross-section shapes that an external body portion 40 for an embodiment may have Oust a few examples). Cross-section shapes that are round, rounded, or have rounded corners are preferred for being less obstructive to objects passing thereby.

Figure 23:
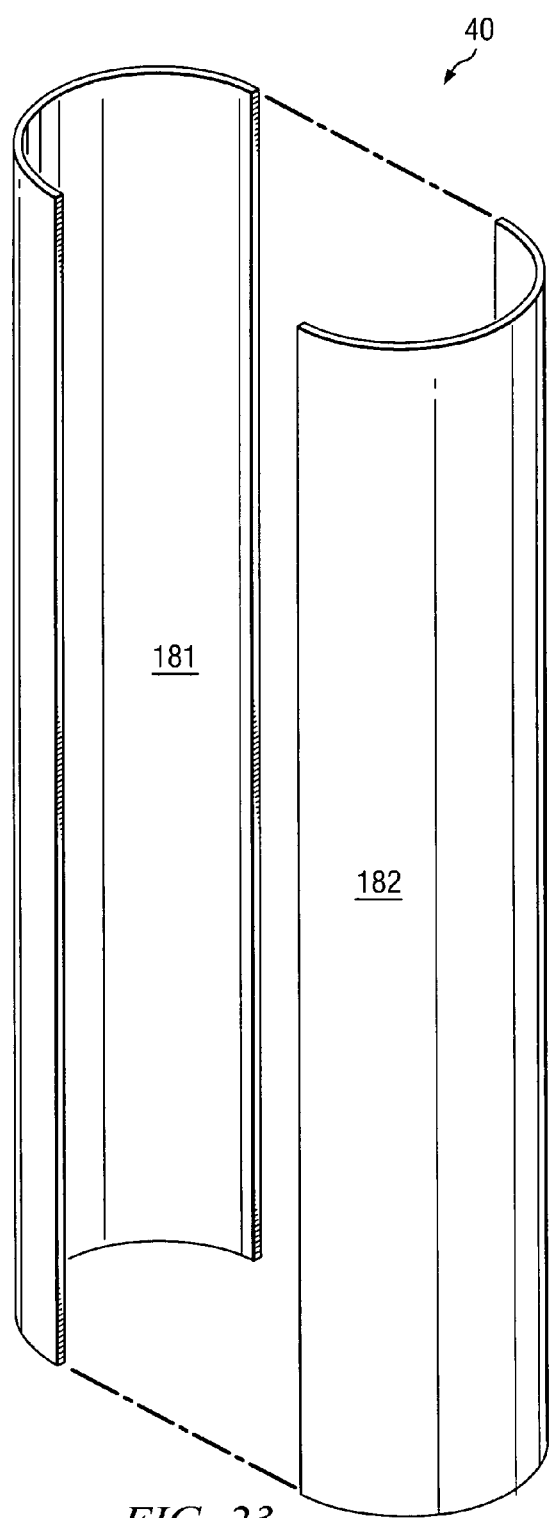
FIG. 23 shows an external body portion that includes two separable portions.

As another variation upon an embodiment of the present invention, the external body portion 40 may include multiple portions that together form the external body portion 40. For example, as shown in FIG. 23, the external body portion 40 may include first and second vertically-extending portions 181, 182 that are separable from each other. Although the structure 34 may be less rigid when the external body portion 40 is made up of two or more separable pieces, there may be advantages gained by having such a configuration. For example, it may be easier to assemble and disassemble the structure 34 for installation or maintenance. If one part of the external body portion 40 is damaged, the other parts of the external body portion may still be useable. This may be useful where a certain portion of the external body portion 40 is more prone to being hit for a particular application. Also, it may be desirable to have different parts of the external body portion 40 made from different materials. Referring again to FIG. 23, for example, the first vertically-extending portion 181 may be made of PVC and the second vertically-extending portion 182 may be made of a low-loss plastic material that has a very low dB drop (e.g., ½ dB drop) through it for the radio frequency waves used in a given RFID system 30. In still other embodiments, it may be preferred to provide one or more windows of low-loss material positioned in front of the antennas 70 to optimize the performance of the RFID system 30.

In a preferred embodiment, a switch 200 may be placed between the external body portion 40 and the base portion 36 to sense when the external body portion 40 has been removed from the base portion 36 (see e.g., FIGS. 24A–24C discussed below). Such a switch 200 may also be used to detect when a portion of the external body portion 40 is broken away or when the external body portion 40 is been partially removed, tilted, or lifted away from the base portion 36. Such switch may be used to disable the system 30 and/or to trigger an alarm, for example.

Because the external body portion 40 (covering the antennas 70) will typically absorb part of and diminish the strength of the radio frequency waves transmitted and received for the RFID system 30, it may be desirable to increase the signal strength to the antennas 70 to compensate for such losses. For example, the power output from the antenna 70 may be increased so that there is a point on the outside surface of the external body portion 40 where the dB loss is effectively 0 dB (as if the antenna 70 was not covered). However, the power output radiated from the RFID system 30 should conform to Federal Communications Commission (FCC) regulations (e.g., Part 15 requirements limiting to one watt of radiated power) to be operated legally. If the external body portion 40 is removed and the power is still boosted to the antennas 70 to compensate for the no longer present external body portion 40, the system 30 would likely violate FCC regulations. Thus, it is preferred to use a switch (or sensor) that detects whether the external body portion 40 has been moved or removed (as discussed above).

Figure 24A:
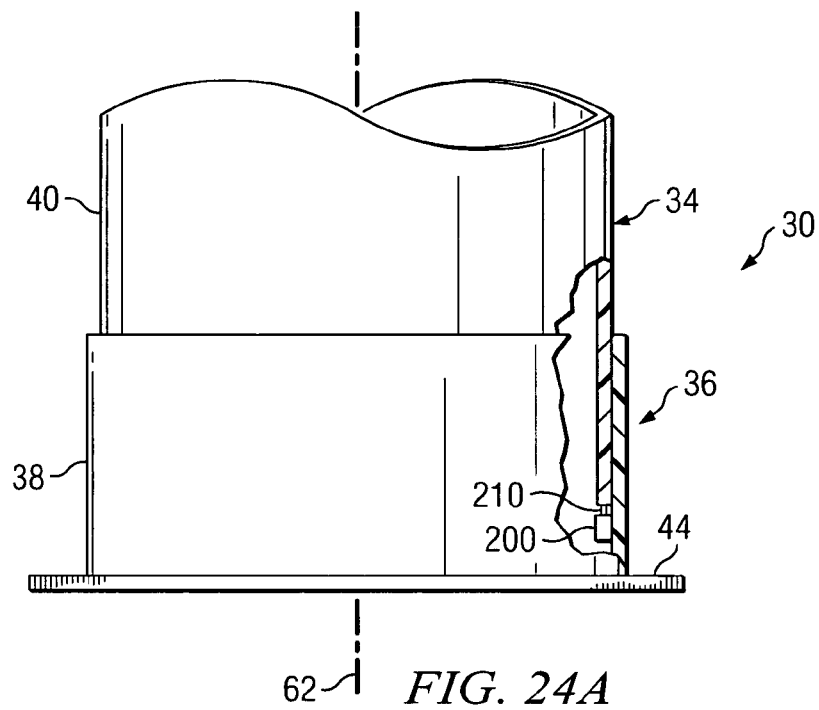
FIGS. 24A–24C are side views showing a lower portion of an embodiment of the present invention incorporating a switch, and showing the structure in various configurations.
Figure 24B:
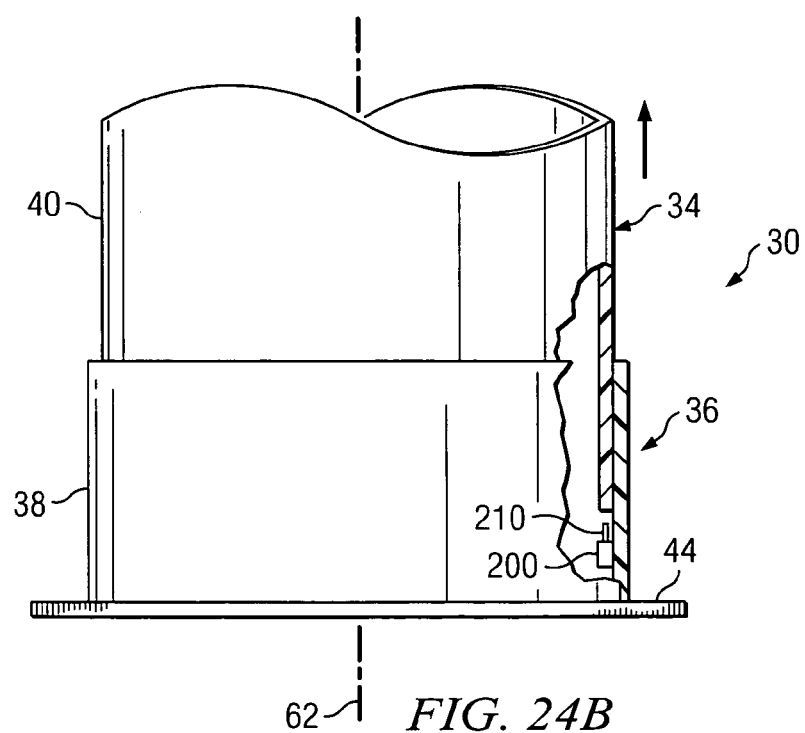
Figure 24C:
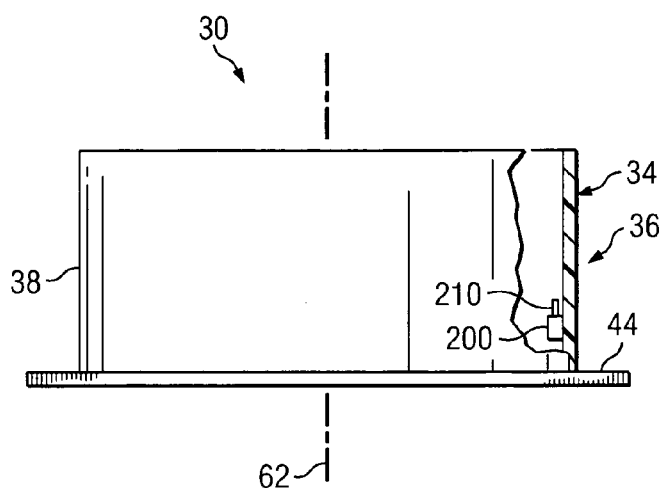

FIGS. 24A–24C show various configurations for a lower portion of an embodiment of the present invention that incorporates the use of a switch 200. Preferably, the switch 200 is electrically or communicably (e.g., optical, wireless) coupled to the antenna-driving equipment (e.g., electrical components 90) so that the power provided to the antenna(s) 70 may be changed based upon a current switch position of the switch 200.

In FIG. 24A, the structure 34 of the RFID system 30 is shown in a first configuration, which is the preferred configuration during operation of the RFID system 30. In the first configuration, the external body portion 40 is operably installed (e.g., completely installed) relative to the base portion 36, the antenna(s) 70 (not shown in FIGS. 24A–24C) are located within the external body portion 40, and the switch 200 is in a first switch position. In this example, the switch toggle 210 is pressed down in the first switch position as the external body portion 40 engages against the switch toggle 210. The RFID system 30 is preferably configured so that when the switch 200 is in the first switch position (see e.g., FIG. 24A), the power supplied to the antenna(s) 70 during use is above a first predetermined level and is at or below a second predetermined level. This second predetermined level is preferably selected based upon providing an effective 0 dB loss from the external body portion 40 being in front of the antenna(s) 70. In a preferred setup, the radiated power emitted from the RFID system 30 is at below a predetermined wattage. This predetermined wattage typically will be the maximum emitted wattage that the FCC (or some other governmental regulation agency or safety association) will allow. Thus, even though the antenna(s) 70 are covered by the external body portion 40 in the first configuration of the structure 34 (see e.g., FIG. 24A), the power to the antenna(s) 70 may be increased (above the first predetermined level) to compensate for the attenuation of the radio frequency through the external body portion 40.

In FIGS. 24B and 24C, the structure of the RFID system 30 is shown in a second configuration. In the second configuration, at least part of the external body portion 40 is farther from the base portion 36 along the vertical axis 62 than when the structure 34 is in the first configuration. In the second configuration of the structure 34, the switch 200 is in a second switch position, which is different than the first switch position. Preferably, the first switch position provides an "on" configuration for the switch 200 and oppositely the second switch position provides an "off" configuration for the switch 200, or vice versa. For example, in FIG. 24B the external body portion 40 is lifted slightly from the base portion 36, and in FIG. 24C the external body portion 40 has been removed from the base portion 36. In this example, the switch toggle 210 is depressed in the second switch position when the external body portion 40 does not engage against the switch toggle 210. The RFID system 30 is preferably configured so that when the switch 200 is in the second switch position (see e.g., FIGS. 24B and 24C), the power supplied to the antenna(s) 70 during use is at or below a first predetermined level. This first predetermined level is preferably selected based upon providing a radiated power emitted from the RFID system that is at or below the predetermined wattage when the external body portion 40 is completely removed. Again, this predetermined wattage will typically be the maximum emitted wattage that the FCC (or some other governmental regulation agency or safety association) will allow. Thus, the switch 200 may be used to ensure that the power emitted from the RFID system 30 does not exceed the allowable wattage when the external body portion 40 is (or is assumed to be) removed (i.e., when the switch 200 is not in the first switch position). Configuring the RFID system 30 with a switch 200 to control the radiated power emitted during use should ensure that the system 30 will still meet FCC requirements when attempting to boost the antenna power to compensate for the attenuation through the external body portion 40.

Although a mechanically-actuated toggle 210 is shown for the switch 200 in FIGS. 24A–24C, as an example, any other suitable switching device may be used as well, including (but not limited to): a photosensor switch, an optically-triggered switch, a pressure-sensitive switch, a pressure-actuated switch, a magnetically-actuated switch, an electrically-actuated switch, a motion-detection switch, other mechanically actuated switches, and combinations thereof, for example. With the benefit of this disclosure, one of ordinary skill in the art will likely realize many possible switches that may be used in an embodiment of the present invention. Also, the number of switches used in an embodiment may vary (e.g., one, two, three, etc.).

Figure 25:
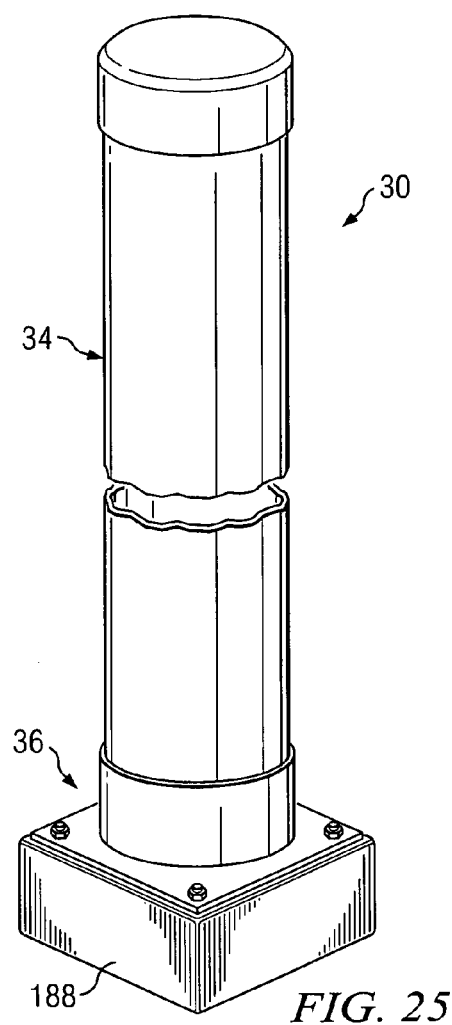
FIGS. 25–33 illustrate other variations, embodiments, and applications of the present invention.

FIG. 25 shows an illustrative embodiment of the present invention having a riser platform portion 188 as part of the base portion 36 or attached below the base portion 36. The riser platform portion 188 may be made from diamond-grid sheet metal formed and welded to form the appropriate shape, for example. OSHA standards require forklifts to keep there forks lower than 8 inches while driving and/or carrying a load from one location to another. Thus, a riser platform portion 188 added to or as part of an embodiment of the present invention may be advantageous in providing a strong and protective base for the RFID system 30 (i.e., to protect against encounters with crates and/or forklift forks). Preferably the riser platform portion 188 has a height of about 8 inches or more, especially where the RFID system 30 will be used in an environment in close proximity to fork lift paths.

Figure 26:
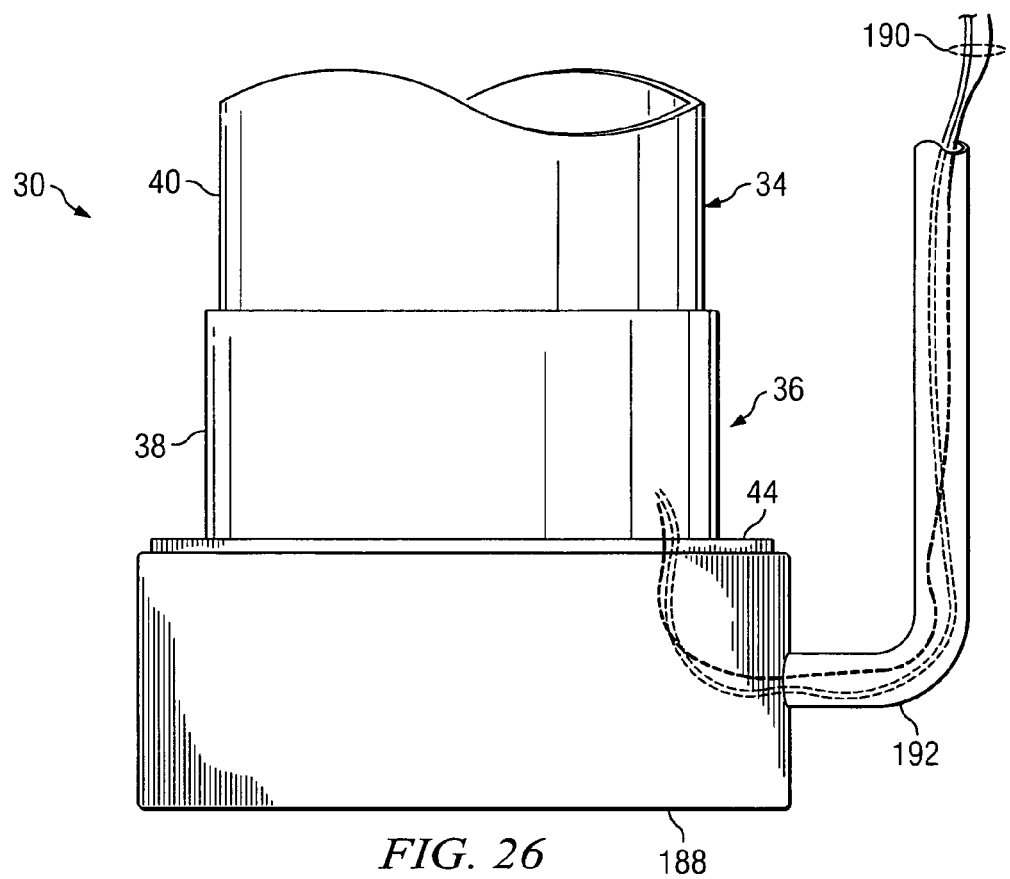

When a riser platform portion 188 is used, as shown in FIG. 26, it may be desirable to route wiring and cables 190 to and from the RFID system 30 through the riser platform portion 188. In FIG. 26, a conduit 192 extending from above (e.g., routed from the ceiling) extends down to the RFID system 30. In some applications (not shown), the conduit 192 may be routed to and affixed to a top portion of the structure 34 (e.g., attached to the top end cap member 42) and then routed into the structure 34. The conduit 192 is routed into a side of the riser portion 188 in FIG. 26. The wiring 190 (shown in dashed line) then extends through a bottom of the base portion 36 into the structure 34. One advantage of such a wire/cable routing scheme is that it may allow for the RFID system 30 to be sealed more easily or more effectively. As discussed above, an RFID system 30 may be used in an environment that is hosed down regularly or exposed to water splashing during other regular cleaning or when it is raining and the RFID system 30 is near a dock door opening to the outside, for example. In such case, the conduit 192, the riser platform portion 188, and the lower part or the entirety of the structure 34 may be sealed (e.g., with silicon caulk) to prevent liquids from entering the inside of the structure 34. Thus, the structure 34 may protect the antennas and other associated electrical equipment from the elements and environment outside of and surrounding the RFID system 30. This is yet another advantage that may be provided by an embodiment of the present invention.

Figure 27:
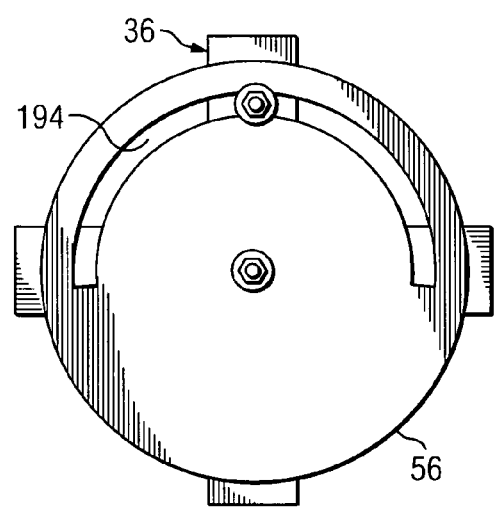

FIG. 27 illustrates a top view of a bottom support disc 56 of an illustrative embodiment of the present invention (see e.g., support disc 56 shown in FIGS. 8, 14, and 16–19). In the bottom support disc 56 of FIG. 27 has a generally semi-circular slot 194 formed therein for providing pivotal adjustment relative to the base portion 36.

Figure 28:
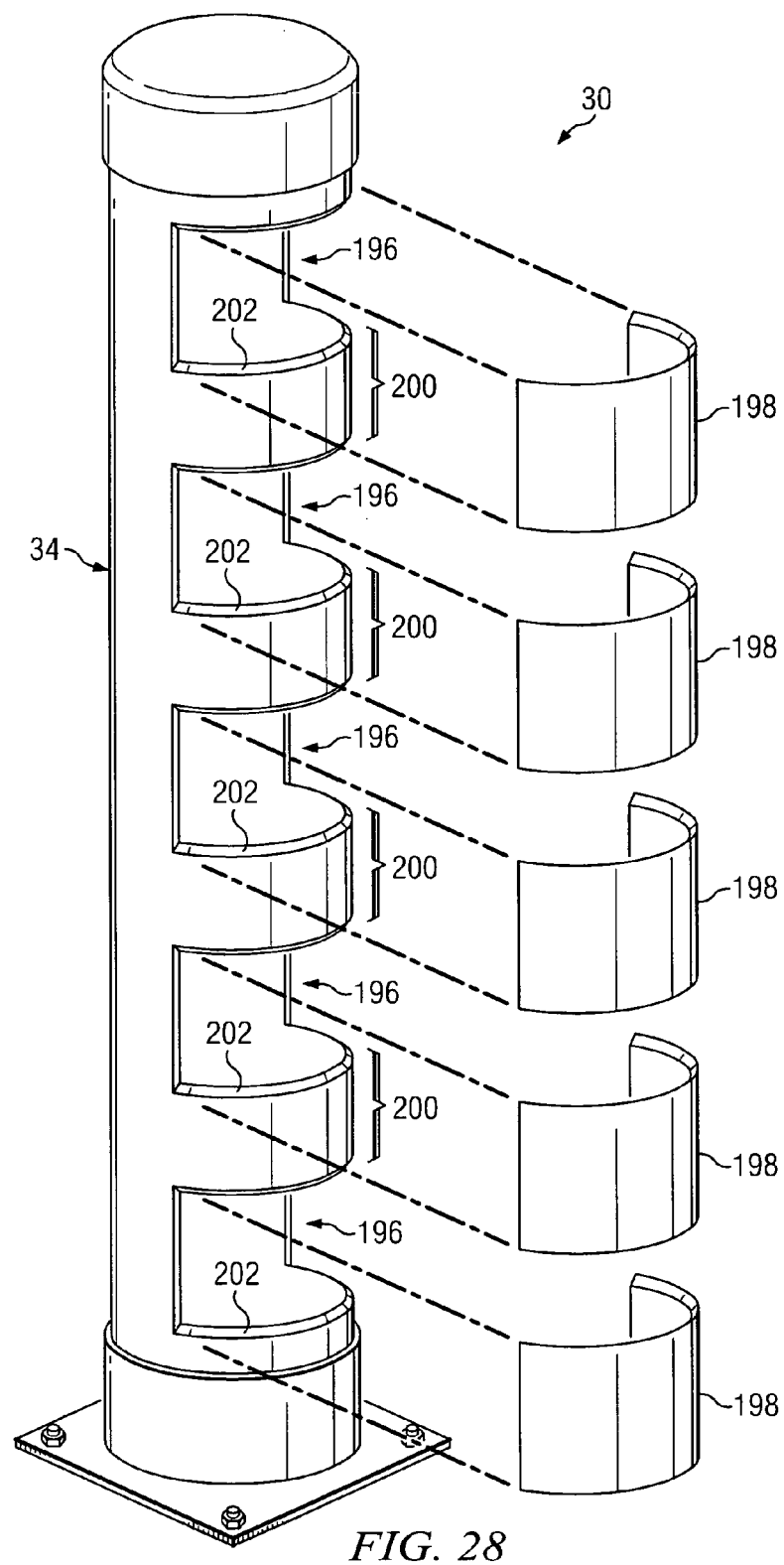

FIG. 28 shows a structure 34 for an RFID system 30 of an illustrative embodiment of the present invention, which has access openings 196 and access doors 198. The size, number, and placement of access openings may vary. The arrangement shown in FIG. 28 is a preferred arrangement for providing access openings 196 into the structure 34 for several reasons. By separating the accesses openings 196 along the length of the structure 34 and leaving rib portions 200 between the access openings 196, the structure 34 better retains its original shape (i.e., shape prior to forming the access openings 196). This is especially beneficial when the structure 34 is made from PVC, plastic, or other similar materials that have a tendency to deform after cutting access holes 196 therein. In the embodiment shown in FIG. 28, the access doors 198 are adapted to fit over the access openings 196 and rest upon recessed extensions 202 remaining within the access openings 196. These recessed extensions 202 may be formed by thinning a sidewall portion of the structure 34, for example. The access openings 196 may be placed at locations where antennas, and/or other components that may need to be accessed during installation, adjustment, and/or maintenance of the system 30, so that such components may be accessed easier and/or faster. After the system 30 is installed and adjusted for service, the access openings 196 covered by the access doors 198 may be sealed (e.g., using silicon caulk and/or gaskets) to hinder or prevent liquids or other contaminants from entering into the structure 34.

Figure 29A:
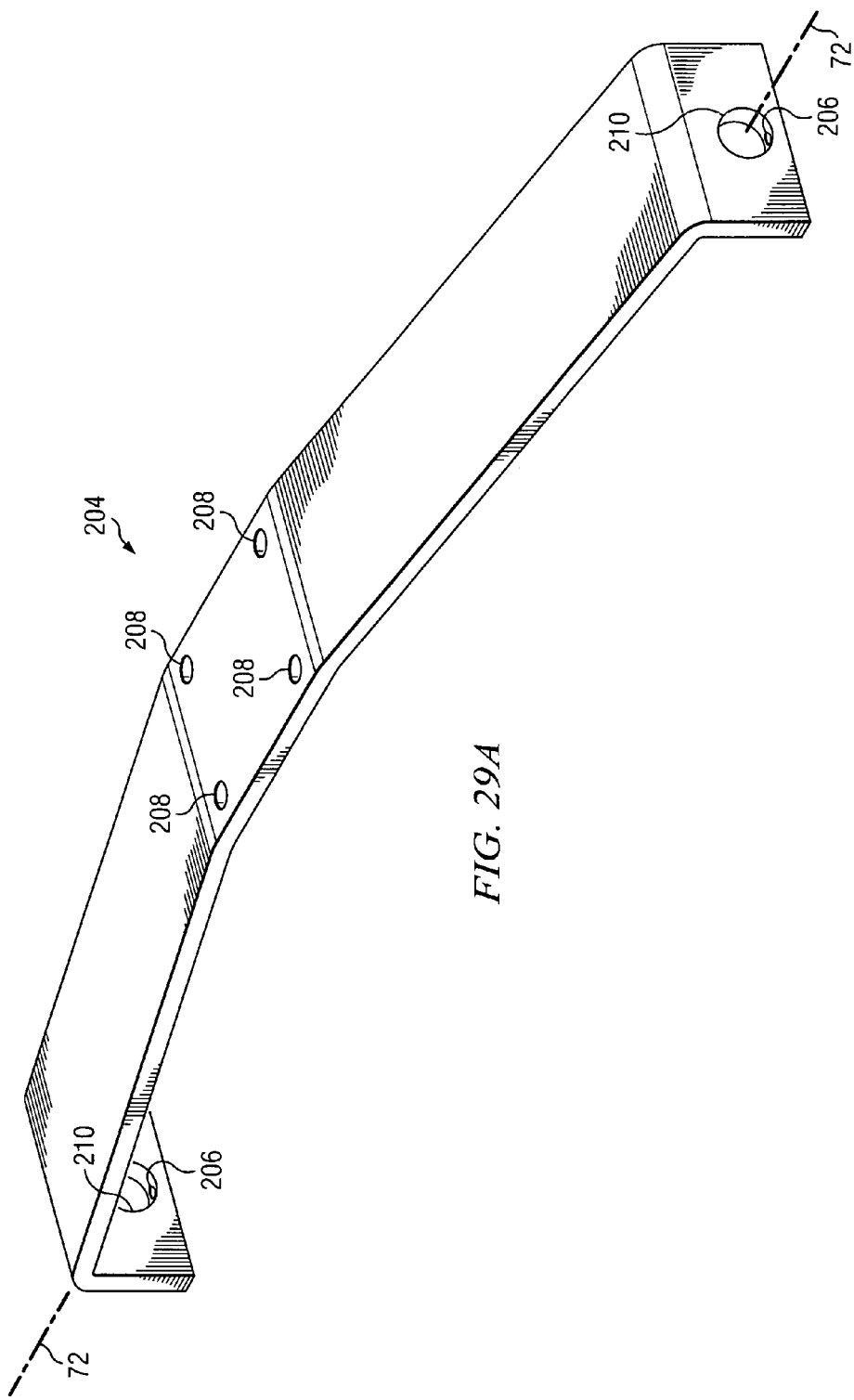
Figure 29B:
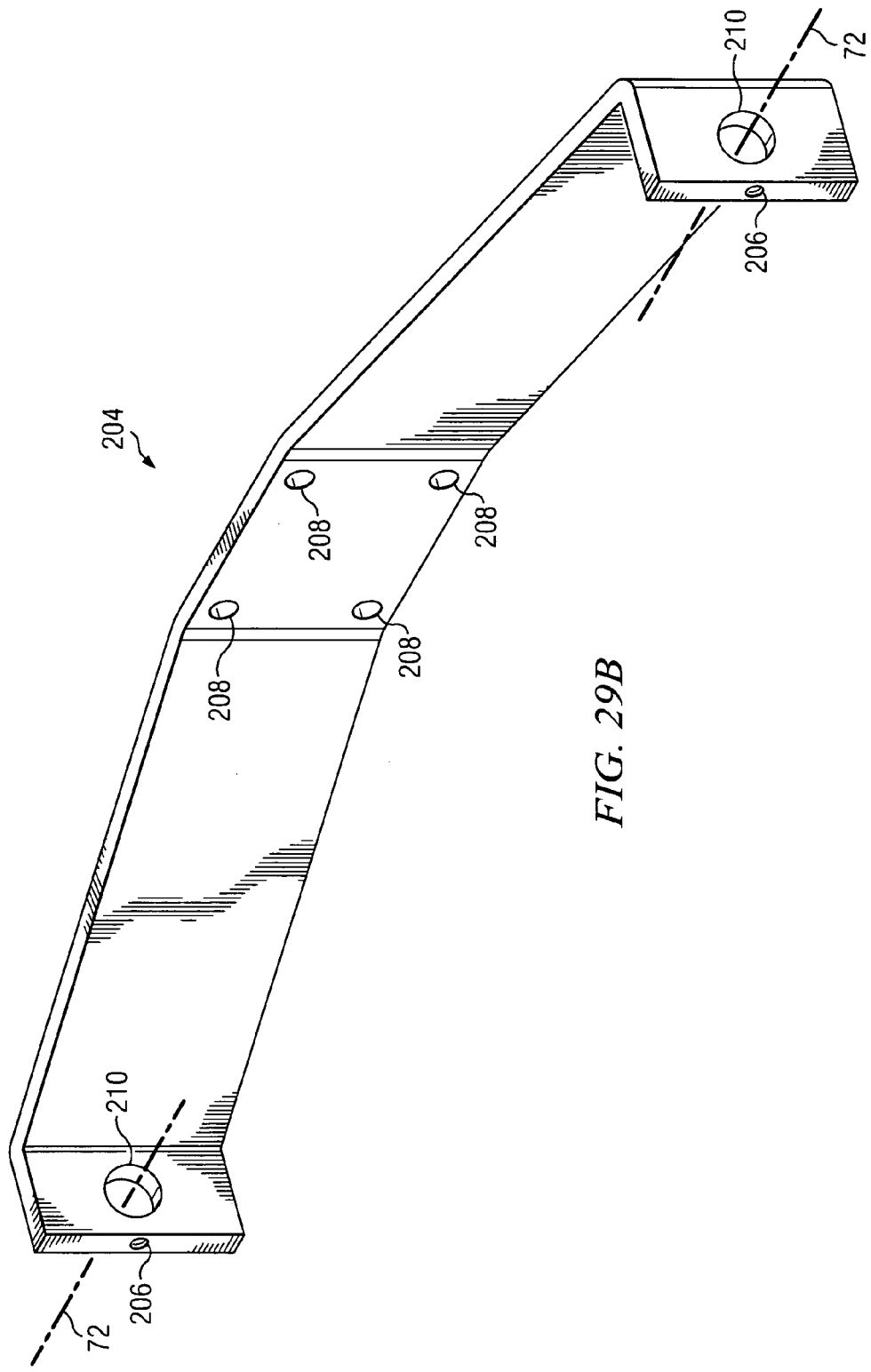

FIGS. 29A–33 illustrate various aspects of another preferred and illustrative embodiment of the present invention. FIGS. 29A and 29B show various views of a generally V-shaped bracket 204 that may be used to retain an antenna 70 and/or a paddle portion 68. The brackets 204 of FIGS. 29A and 29B may be used as frame portions 60 or as an alternative to the frame portions 60 shown in FIGS. 17–19, for example. Preferably, the bracket 204 has threaded holes 206 adapted to receive set screws 82, which may be used to retain a position of a paddle portion 68 and/or antenna 70 about a horizontal axis 72. Also shown in FIGS. 29A and 29B are attachment holes 208 that may be used for attaching the bracket 204 to a rod 102. The paddle portions 68 may be attached using attachment holes 210.

Figure 30:
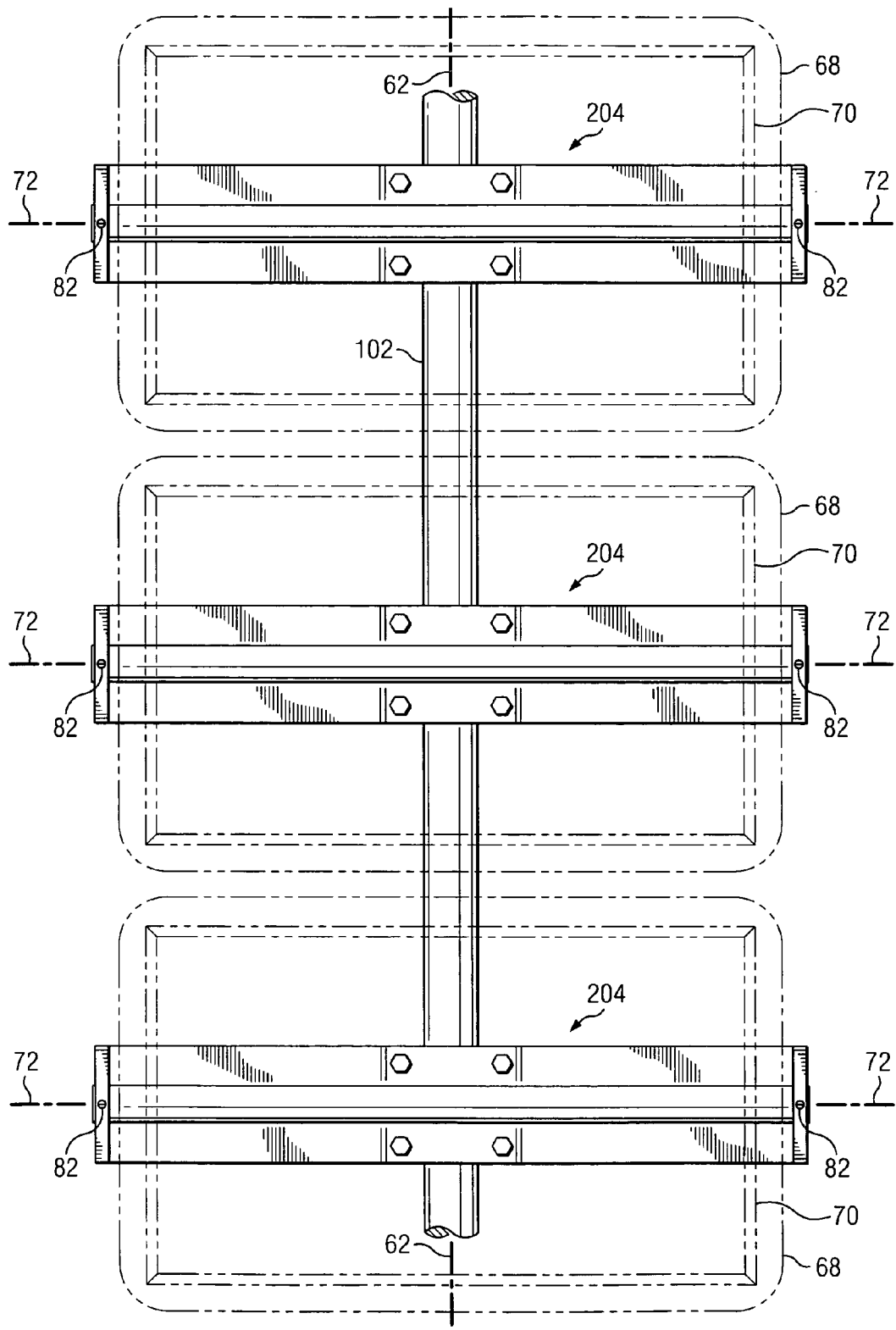

FIG. 30 shows a side view of three brackets 204 being used as a frame portion for supporting a set of antennas 70. In FIG. 3, the paddle portions 68 and the antennas 70 are shown in dashed lines and transparent to better illustrate the other portions of the frame structure. The brackets 204 are each independently attached to a rod 102 (in the same way that the frame portions 60 of FIGS. 17 and 19 extend from a rod 102), where the rod 102 is supported by a bottom support disc 56, an extra support member 130, and a top support disc 126 (see e.g., in FIGS. 17 and 19, but not shown in FIG. 30 for simplifying the drawings). Each of the brackets 204 may be pivoted independently of the rod 102.

Figure 31:
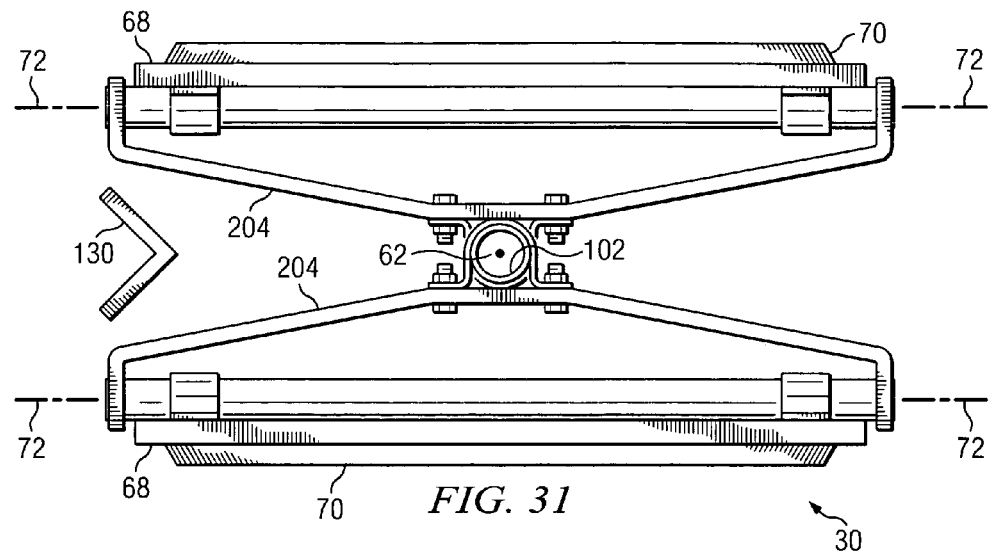

FIG. 31 is a top view showing two of the brackets 204 supporting antennas 70 facing opposite directions. Note that with the brackets 204 being generally V-shaped, the brackets 204 may be pivoted further without interfering with the extra support 130 (when used), as compared to a bracket or frame portion 60 that extends straight from the attachment point at the rod 102. Also, the generally V-shape allows for antennas 70 facing opposite directions, and that are overlapping at their level of placement along the rod 102, to be pivoted to some extent (e.g., about 15–45 degrees) before interfering with each other. Note that in FIGS. 31 and 32, the external body portion 40 and other portions of the system 30 are not shown for purposes of simplifying the drawings.

Figure 32:
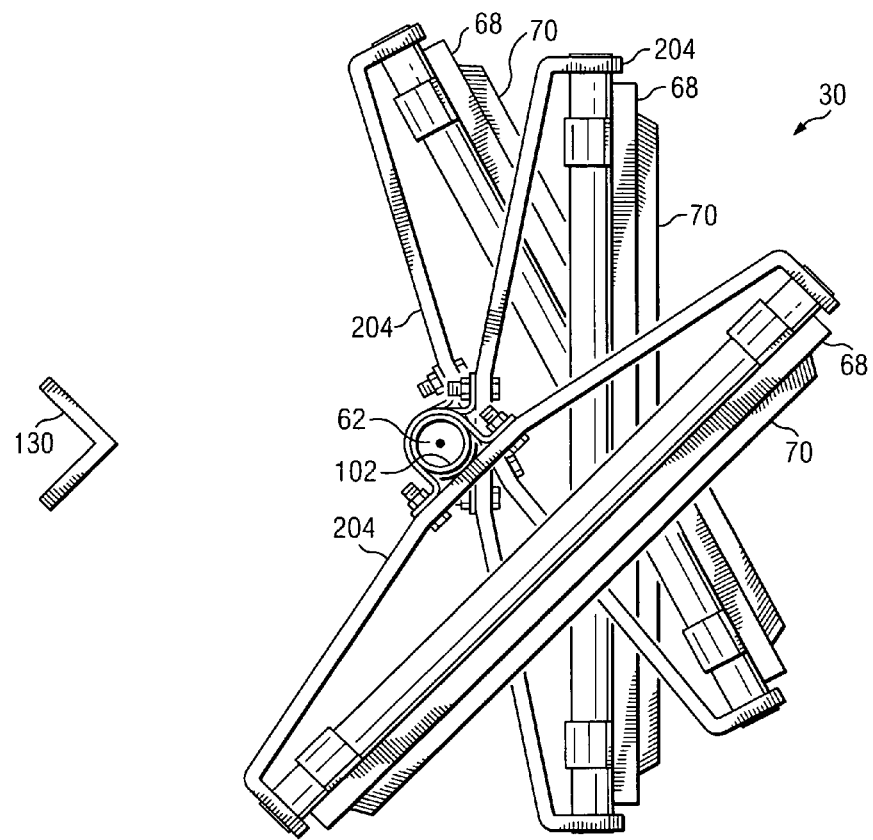
Figure 33:
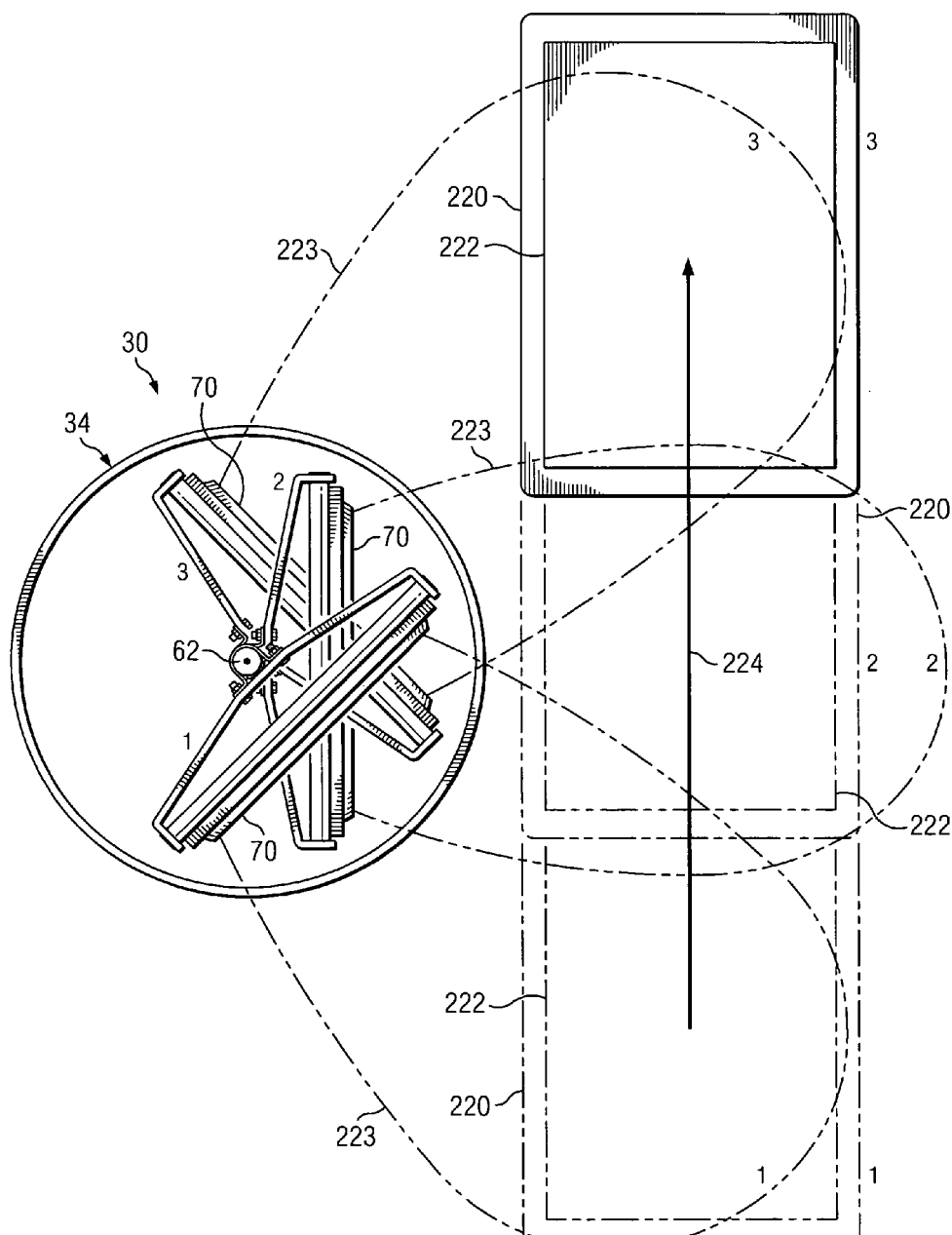

FIGS. 32 and 33 are top views of the three brackets 204 and antennas 70 of FIG. 30, but with each of the antennas 70 aimed in different directions. Having the capability of aiming each antenna 70 in a different direction may be advantageous in numerous applications. FIG. 33 illustrates an application where having the antennas 70 positioned at different angles about the vertical axis 62 is helpful. In FIG. 33, a crate 220 stacked high with a set of RFID-tagged items 222 is shown at different positions as it moves past an RFID system 30 through a portal. If such crate 220 is being carried by a forklift, for example, and traveling at a speed of more than about 6 miles per hour, for example, and if the antennas are all aimed at a same angle about the vertical axis 62, then it becomes difficult to scan all of the RFID tags on the whole stack as the set of items 222 passes through the portal. The reason for this difficulty is that there is a latency time between the use of each antenna 70 at each level (e.g., about 112 ms). Thus, in such case, the first and/or last activated antennas may not sufficiently scan all of the items 222. RFID tags outside of the antenna's beam 223 may not be sufficiently energized to reflect its signal. By placing the antennas 70 at different angles about the vertical axis 62, as shown in FIG. 33 for example, the antennas 70 may be fired in sequence as the crate 220 of RFID-tagged items 222 pass to account for the velocity of the items 222 relative to the RFID system 30. In FIG. 3, the designations 1, 2, and 3 are used to illustrate the timing sequence of using the antennas 70 relative to the movement of the crate 220 of RFID-tagged items 222. The arrow 224 in FIG. 33 indicates the direction of movement of the crate 220 of items 222. This sequence may be reversed for items passing the RFID system 30 in the opposite direction.

Even though the frame portions 60 of the illustrative embodiments shown herein extend from the base portion 36 along the vertical axis 62, in other embodiments (not shown), there may not be a frame portion 60 (e.g., antennas 70 attached to the inside of and supported by external body portion 40) or the frame portion(s) 60 may be attached to the inside of and supported by the external body portion 40, for example. With the benefit of this disclosure, one of ordinary skill in the art may realize many other different or equivalent structural configurations for an embodiment of the present invention without departing from the scope of the appended claims.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A radio frequency identification (RFID) system comprising:
    a radio frequency antenna;
    a generally column-shaped structure supporting the antenna therein, the structure comprising
        a base portion,
        a frame portion attached to and supported by the base portion, the frame portion extending along a vertical axis of the structure,
        a paddle portion pivotably coupled to the frame portion, wherein the antenna is supported by and attached to the paddle portion, and
        a hollow and elongated external body portion attached to and supported by the base portion, and the external body portion extending along the vertical axis, wherein the frame portion, the paddle portion, and the antenna are located within the external body portion.

2. The RFID system of claim 1, wherein the frame portion is adapted to pivot about the vertical axis with respect to the base portion.

3. The RFID system of claim 1, wherein the paddle portion is adapted to pivot about a horizontal axis.

4. The RFID system of claim 3, wherein the paddle portion is adapted to retain a position about the horizontal axis.

5. The RFID system of claim 4, wherein the structure further comprises an adjustable-length member extending between the paddle portion and the frame portion.

6. The RFID system of claim 4, wherein the structure further comprises a set screw extending through the frame portion and adapted to engage against a part of the paddle portion.

7. The RFID system of claim 1, wherein the structure further comprises a hollow coupler member attached to the base portion, wherein the external body portion is attached to the base portion by the coupler member.

8. The RFID system of claim 1, wherein the paddle portion is removably attached to the frame portion.

9. The RFID system of claim 1, wherein the external body portion is removably attached to the base portion.

10. The RFID system of claim 1, wherein the frame portion of the structure further comprises multiple tiers of horizontal platforms.

11. The RFID system of claim 1, further comprising electrical components supported by the frame portion and located within the external body portion, the electrical components being selected from a group consisting of a computer processor, a memory storage device, a wireless communication device, an RFID reader device, a battery, and combinations thereof.

12. The RFID system of claim 1, wherein the structure further comprises a top end cap member removably attached to the external body portion, the top end cap member being located at an upper end of the vertical axis.

13. The RFID system of claim 1, wherein the external body portion comprises first and second vertically-extending portions, the first and second portions being separable from each other.

14. The RFID system of claim 13, wherein the first vertically-extending portion is made from a material that differs from that of the second vertically-extending portion.

15. The RFID system of claim 1, wherein the external body portion comprises one or more access openings fonned therein, and comprises corresponding access door(s) adapted to cover the access opening(s).

16. The RFID system of claim 1, wherein the external body portion has a cross-section shape perpendicular to the vertical axis selected from a group consisting of a circle, an oval, an ellipse, a polygon, a rectangle, a square, a hexagon, and an octagon.

17. The RFID system of claim 1, further comprising a communication system attached to the structure, wherein the communication system is selected from a group consisting of an indicator light, an electronic display screen, a still camera, a video camera, a sign, a banner, and combinations thereof.

18. The RFID system of claim 1, wherein the paddle portion has a planar shape selected from a group consisting of rectangular, generally rectangular with rounded corners, octagonal, and combinations thereof.

19. The RFID system of claim 1, further comprising a switch adapted to change switch position when the external body portion is moved vertically relative to the base portion.

20. The RFID system of claim 19, wherein the switch is connected such that the change of switch position triggers an alarm.

21. The RFID system of claim 19, wherein the switch is connected such that the change of switch position causes a decrease in power supplied to the antenna.

22. The RFID system of claim 1, further comprising a riser platform portion attached below the base portion.

23. The RFID system of claim 22, wherein wires enter the system through a side of the riser platform portion.

24. The RFID system of claim 1, wherein the frame portion comprises a bottom support disc, and wherein the bottom support disc has a generally semi-circular slot formed therein for providing pivotal adjustment relative to the base portion.

25. The RFID system of claim 1, wherein the frame portion comprises a rod member extending generally along the vertical axis and two or more generally V-shaped brackets, the generally V-shaped brackets being independently coupled to and supported by the rod member, wherein the paddle portion is pivotably coupled to one of the generally V-shaped brackets.

26. The RFID system of claim 1, wherein at least part of the structure maybe sealed with silicon caulk and/or at least one gasket.

27. A radio frequency identification (RFID) system comprising;
   a radio frequency antenna;
   a generally column-shaped structure supporting the antenna therein, the structure comprising:
      a base portion,
      a frame portion supported by the base portion and extending along a vertical axis of the structure, the frame portion being adapted to pivot about the vertical axis with respect to the base portion.
      a paddle portion pivotably coupled to the frame portion, the paddle portion being adapted to pivot about a horizontal axis, wherein the antenna is supported by and attached to the paddle portion,
      a hollow coupler member attached to the base portion, and
      a hollow and elongated external body portion attached to the base portion by the coupler member and extending along the vertical axis, the external body portion being supported by the base portion, wherein the frame portion, the paddle portion, and the antenna are located within the external body portion.

28. A radio frequency identification (RFID) system comprising:
   a radio frequency antenna electrically connected to an electrical power source, the antenna being adapted to transmit radio frequency waves to excite an RFID tag; and
   a generally column-shaped structure supporting the antenna therein, the structure comprising:
      a base portion, and
      a cylindrical-shaped hollow external body portion extending along a vertical axis, the external body portion being supported by the base portion, wherein the antenna is located within the external body portion, and wherein the RFID tag is located outside of the generally column-shaped structure.

29. A radio frequency identification (RFID) system comprising:
   a radio frequency antenna;
   a generally column-shaped structure supporting the antenna therein, the structure comprising:
      a base portion,
      a hollow external body portion adapted to extend along a vertical axis and to be supported by the base portion when the structure is in a first configuration such that the antenna is located within the external body portion, and
      a switch located between the base portion and the external body portion when the structure is in the first configuration,
      in the first configuration of the structure, the external body portion is operably installed relative to the base portion, the antenna is located within the external body portion, the switch is in a first switch position, and based upon the switch being in the first switch position, power supplied to the antenna during use is above a first predetermined level and below a second predetermined level, wherein the second predetermined level is greater than the first predetermined level, and the structure having a second configuration in which at least part of the external body portion is farther from the base portion along the vertical axis than when the structure is in the first configuration, the switch is in a second switch position, and based upon the switch being in the second switch position, the power supplied to the antenna during use is at or below the first predetermined level.

30. The RFID system of claim 29, wherein the structure further comprises:

a frame portion attached to and supported by the base portion, the frame portion extending along a vertical axis of the structure; and a paddle portion pivotably coupled to the frame portion, wherein the antenna is supported by and attached to the paddle portion, and wherein the frame portion, the paddle portion, and the antenna are located within the external body portion when the external body portion is operably installed in the first position.

31. The RFID system of claim 30, wherein the frame portion is adapted to pivot about the vertical axis with respect to the base portion.

32. The RFID system of claim 30, wherein the paddle portion is adapted to pivot about a horizontal axis.

33. A radio frequency identification (RFID) system comprising:

two or more radio frequency antennas;

a generally column-shaped structure supporting the antennas therein, the generally column-shaped structure comprising:

a hollow and elongated external body portion extending along a vertical axis of the generally column-shaped structure, two or more antenna support structures supporting the two or more antennas, the two or more antenna support structures being independently pivotable about the vertical axis within the body portion, such that the two or more antennas may be aimed in different directions.

34. A method of scanning radio frequency identification (RFID) tags, comprising:

passing a set of items grouped together through a portal, the items having RFID tags associated therewith, wherein a generally column-shaped structure stands at the portal, the generally column-shaped structure comprising a hollow and elongated external body portion extending along a vertical axis of the generally column-shaped structure, and comprising a set of radio frequency antennas located within the external body portion, wherein the set of antennas are independently pivotable about the vertical axis;

as the set of items are passed through the portal, radiating at least part of the set of items at a first level with radio frequency energy using a first antenna of the set of antennas, the first antenna being positioned at a first angle relative to a reference point about the vertical axis;

as the set of items are passed through the portal, radiating at least part of the set of items at a second level with radio frequency energy using a second antenna of the set of antennas, the second antenna being positioned at a second angle relative to the reference point about the vertical axis, wherein the second level differs from the first level, and wherein the second angle differs from the first angle; and as the set of items are passed through the portal, radiating at least part of the set of items at a third level with radio frequency energy using a third antenna of the set of antennas, the third antenna being positioned at a third angle relative to the reference point about the vertical axis, wherein the third level differs from the first and second levels, and wherein the third angle differs from the first and second angles.

35. The method of claim 34, wherein the relative positions of the first, second, and third angles are set as a function of an average velocity of the set of items passing through the portal and as a function of a timing sequence of the antennas being used to radiate the set of items.

36. A method of controlling radiated power emitted from a radio frequency identification (RFID) system, comprising:

operating the RFID system while a generally column-shaped structure of the RFID system is in a first configuration such that radiated power emitted from the RFID system is at or below a predetermined wattage, the structure supporting therein an antenna of the RFID system, and the structure of the RFID system comprising:

a base portion, a hollow external body portion adapted to extend along a vertical axis and to be supported by the base portion when the structure is in the first configuration such that the antenna is located within the external body portion, and a switch located between the base portion and the external body portion when the structure is in the first configuration, and the switch being in a first switch position when the structure is in the first configuration, when operating the RFID system while the structure is in the first configuration and the switch is in the first switch position, providing power to the antenna above a first predetermined level and below a second predetermined level, wherein the second predetermined level is greater than the first predetermined level; and operating the RFID system white the structure of the RFID system is in a second configuration such that radiated power emitted from the RFID system is at or below the predetermined wattage, and in the second configuration at least part of the external body portion is farther from the base portion along the vertical axis than when the structure is in the first configuration, the switch is in a second switch position, and based upon the switch being in the second switch position, the power supplied to the antenna during the operating of the RFID system is at or below the first predetermined level.

* * * * *